United States Patent
Karve et al.

(10) Patent No.: US 10,963,249 B2
(45) Date of Patent: Mar. 30, 2021

(54) PROCESSOR PREFETCHER MODE GOVERNOR FOR SWITCHING BETWEEN PREFETCH MODES

(71) Applicant: International Business Machines Corporation, Armonk, NY (US)

(72) Inventors: Mohit Karve, Austin, TX (US); Vivek Britto, Austin, TX (US); George W. Rohrbaugh, III, Charlotte, VT (US); Brian W. Thompto, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/178,740

(22) Filed: Nov. 2, 2018

(65) Prior Publication Data

US 2020/0142698 A1  May 7, 2020

(51) Int. Cl.
*G06F 9/30* (2018.01)
*G06F 12/0862* (2016.01)
*G06F 9/38* (2018.01)

(52) U.S. Cl.
CPC ........ *G06F 9/30047* (2013.01); *G06F 9/3802* (2013.01); *G06F 12/0862* (2013.01); *G06F 2212/602* (2013.01); *G06F 2212/6022* (2013.01)

(58) Field of Classification Search
CPC .................................................. G06F 9/3802
See application file for complete search history.

(56) References Cited

U.S. PATENT DOCUMENTS

| | | | |
|---|---|---|---|
| 8,667,225 B2 | 3/2014 | Sander et al. | |
| 8,856,452 B2 | 10/2014 | Sun et al. | |
| 9,304,773 B2 | 4/2016 | Scott et al. | |
| 9,841,911 B2 | 12/2017 | Yu et al. | |
| 2006/0149935 A1* | 7/2006 | Eickemeyer | G06F 9/3804 712/219 |
| 2007/0005905 A1* | 1/2007 | Yasue | G06F 9/383 711/137 |
| 2008/0288751 A1* | 11/2008 | Kocev | G06F 9/383 712/207 |

(Continued)

OTHER PUBLICATIONS

Troubleshooting and Tuning Database Performance, IBM, Jan. 2015.

(Continued)

*Primary Examiner* — Michael J Metzger
(74) *Attorney, Agent, or Firm* — Scully, Scott, Murphy & Presser, P.C.

(57) ABSTRACT

A processor, system and/or techniques are disclosed for prefetching data streams in a processor. A prefetcher issues a plurality of requests to pre-fetch data from a stream in a plurality of streams; evaluates a confidence level of at least the first request based on an amount of confirmations observed in the stream; and assigns at least a first more aggressive prefetching ramping mode or a second less aggressive prefetching ramping mode based upon the confidence level of a thread associated with the prefetch request, wherein the prefetcher has one or more probationary states and is configured to transition between the first and second prefetching ramp mode by entering at least one of the probation states wherein the prefetcher continues to operate in the first prefetching ramp mode. In another aspect, the prefetcher may transition to the one or more probation states after a number of cycles.

18 Claims, 10 Drawing Sheets

(56) References Cited

U.S. PATENT DOCUMENTS

| | | | |
|---|---|---|---|
| 2009/0106538 A1* | 4/2009 | Bishop | G06F 9/383 |
| | | | 712/226 |
| 2009/0198907 A1* | 8/2009 | Speight | G06F 12/0862 |
| | | | 711/137 |
| 2009/0199190 A1* | 8/2009 | Chen | G06F 9/383 |
| | | | 718/102 |
| 2015/0234663 A1* | 8/2015 | Chishti | G06F 9/3808 |
| | | | 712/207 |
| 2016/0034400 A1* | 2/2016 | Dale | G06F 12/0862 |
| | | | 711/122 |
| 2016/0110289 A1* | 4/2016 | Hooker | G06F 9/30047 |
| | | | 711/137 |
| 2017/0147493 A1* | 5/2017 | Eickemeyer | G06F 12/0862 |
| 2017/0161194 A1 | 6/2017 | Loh | |
| 2017/0357587 A1* | 12/2017 | Jones, III | G06F 12/0862 |

OTHER PUBLICATIONS

Disclosed Anonymously, Method and System for Dynamically Adjusting Resources to Support Multiple Execution Modes, Apr. 16, 2015.

Disclosed Anonymously, Improved Prefetchign of Data in a Computer Processor by Identifying and Making Use of Correlated Prefetch Queue Entry Information, Apr. 3, 2013.

Disclosed Anonymously, A Novel Data Prefetch Method Under Heterogeneous Architecture, Dec. 12, 2012.

Disclosed Anonymously, Method and System for Automatically Fetching Data by Analyzing Past Queries Executed by a Plurality of Users, Jun. 12, 2012.

* cited by examiner

PROCESSOR PREFETCHER MODE GOVERNOR FOR SWITCHING BETWEEN PREFETCH MODES

BACKGROUND

Embodiments presented herein are related to data prefetching in a processor, and more specifically, to identifying data streams that do and do not benefit from prefetching.

Data prefetching is a technique that allows a processor to reduce stall time on data accesses. Rather than waiting for a cache miss to initiate a memory fetch, a prefetcher in the processor observes, e.g., in a cache memory, data streams referencing patterns and predicts future references based on such patterns. The prefetcher then retrieves the predicted reference data from memory before the processor actually references the data. Doing so allows the processor to reduce memory access latency and thus increase performance of the processor.

Generally, data prefetch techniques establish streams based on predicted patterns. An initial access to a stream is referred to as an allocation. Further, each subsequent access to that stream (i.e., an actual demand for a given cache line) is referred to as a confirmation. The prefetcher may determine whether to issue a request to prefetch data from a given stream based on the confidence/depth of the stream, i.e., an amount of confirmations observed in the stream. Typically, the prefetcher may drop requests if the confidence/depth for the stream is low, e.g., the stream has no confirmations. However, one drawback to such an approach is that, occasionally, once the prefetch engine observes at least one confirmation, the prefetcher may assume that the next subsequent accesses to the stream are sequential cache lines and, as a result, blindly issues prefetch requests, even if the accesses do not correspond to sequential cache lines. Consequently, such superfluous prefetches may evict useful cache lines, causing future misses on those cache lines and/or may consume more bandwidth than necessary.

SUMMARY

The summary of the disclosure is given to aid understanding of a computer system, computer architectural structure, processor, and methods of prefetching in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

Certain aspects of the present disclosure provide a processor, a system, and/or a method of processing data in a processor. In an embodiment, a processor comprises a prefetcher configured to issue a plurality of requests to prefetch data from a stream in a plurality of streams; evaluate a confidence level of at least the first request based on an amount of confirmations observed in the stream; and assign at least a first more aggressive prefetching ramping mode or a second less aggressive prefetching ramping mode based upon the confidence level of a thread associated with the pre-fetch request, wherein the prefetcher is further configured to transition from the first prefetching ramp mode to the second prefetching ramp mode by entering at least one probation state wherein the prefetcher continues to operate according to the first prefetching ramp mode. In an embodiment, the prefetcher is further configured to remain in the probation state for a number of cycles.

In another aspect a system is disclosed, the system including a memory and a processor, the processor having a prefetcher comprising a prefetch request queue configured for tracking a plurality of requests to prefetch data issued for each stream in a plurality of streams; a confidence predictor configured to evaluate the confidence levels of prefetch requests in a stream; a ramp selector configured to determine the prefetcher ramping mode based at least in part upon the confidence level of the thread associated with the prefetch requests in the stream, wherein the ramp selector selects between at least a first more aggressive prefetcher ramping mode and a second less aggressive prefetcher ramping mode, and a prefetch mode governor that governs at least a first probation state for controlling transitioning between the first prefetcher ramping mode and the second prefetching ramp mode. The prefetcher in an aspect is configured to exit from the second less aggressive prefetcher ramp mode and enter the first probation state after a certain amount of cycles in the second less aggressive prefetcher ramp mode. In response to exiting the second less aggressive prefetcher ramp mode and entering the first probation state the prefetcher in an embodiment is configured to operate according to the first more aggressive prefetching ramp mode.

In a further embodiment a processor is disclosed having a prefetcher configured to issue a plurality of requests to pre-fetch data from a stream in a plurality of streams; evaluate a confidence level of one or more requests to pre-fetch data based on an amount of confirmations observed in the stream; determine a prefetch utilization count based upon the number of cache lines in the thread that are being utilized; and assign at least a first more aggressive prefetching ramp mode or a second less aggressive prefetching ramp mode based at least in part upon the confidence level and prefetch utilization count of the thread associated with the prefetch request. The prefetcher is further configured to exit from the first prefetching ramp mode and enter a first probation state wherein the prefetcher continues to operate according to the first more aggressive prefetching ramp mode, and configured to exit from the second less aggressive prefetching ramp mode and enter a second probation state wherein the prefetcher operates according to the first more aggressive prefetching ramp mode.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE SEVERAL VIEWS OF THE DRAWINGS

The various aspects, features, and embodiments of the information handling system, computer system, computer architectural structure, processor, prefetcher, and their method of operation will be better understood when read in conjunction with the figures provided. Embodiments are provided in the figures for the purpose of illustrating aspects, features, and/or various embodiments of the computer system, computer architectural structure, processor, prefetcher, and their methods of operation, but the claims should not be limited to the precise arrangement, structures, subassemblies, circuitry, modules, units, features, aspects, methods, processes, embodiments, or devices shown, and the arrangements, structures, subassemblies, circuitry, modules, units, features, aspects, methods, processes, embodiments, and devices shown may be used singularly or in combination with other arrangements, structures, subassemblies, circuitry, modules, units, features, aspects, methods, processes, embodiments, and devices.

DETAILED DESCRIPTION

Figure 1:
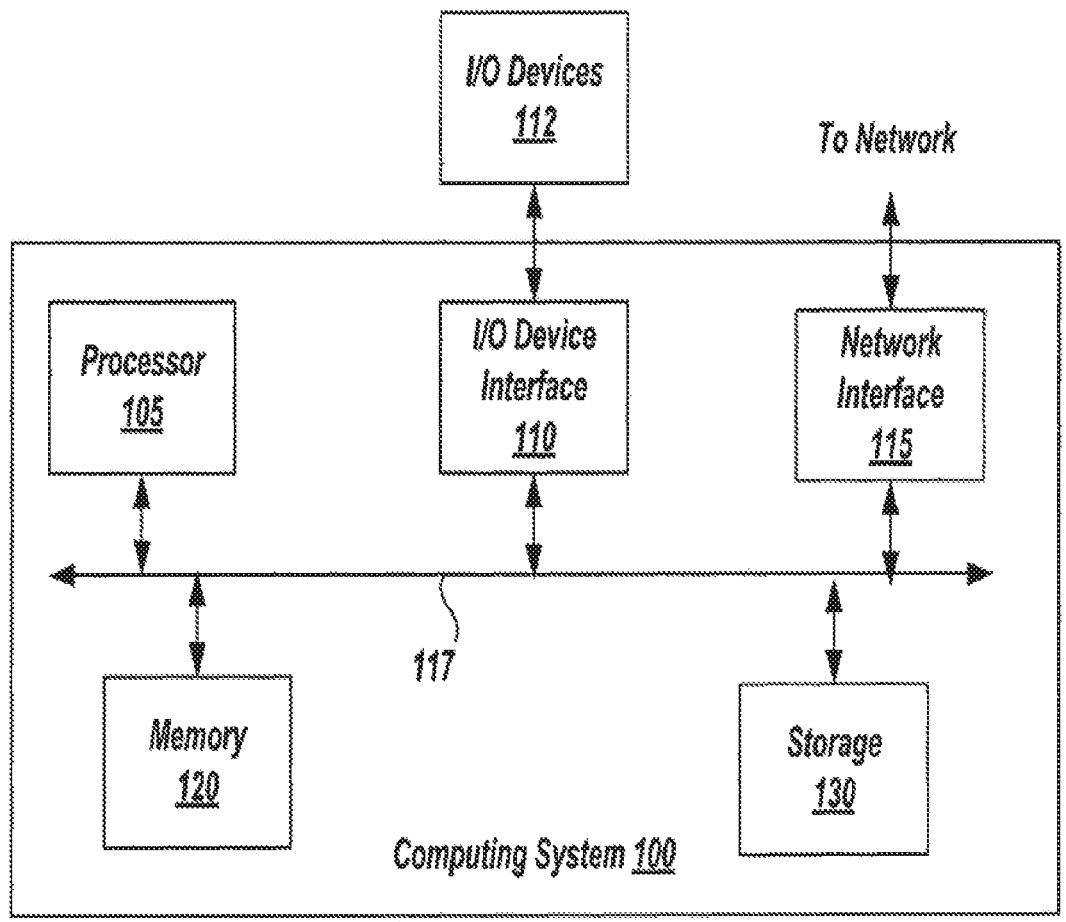
FIG. 1 illustrates an example computing system configured with a processor that identifies data streams that do and do not benefit from prefetching based on stream depth, prefetch utilization, and memory bandwidth constraints, according to one or more embodiments.

The following description is made for illustrating the general principles of the invention and is not meant to limit the inventive concepts claimed herein. In the following detailed description, numerous details are set forth in order to provide an understanding of the information handling system, computer system, computer architectural structure, processor, prefetcher, and their methods of operation, however, it will be understood by those skilled in the art that different and numerous embodiments of the computer system, computer architectural structure, processor, prefetcher, and their methods of operation may be practiced without those specific details, and the claims and invention should not be limited to the arrangements, structures, subassemblies, circuitry, modules, units, features, aspects, processes, methods, embodiments, devices, or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of prefetchers to prefetch data from memory before waiting for a cache miss. It may be noted that a numbered element is numbered according to the figure in which the element is introduced, and is typically referred to by that number in succeeding figures.

Embodiments presented herein disclose techniques for improving data prefetch performance in a processor. More specifically, techniques provide a prefetcher in the processor of a computer system that tracks streams of data accesses spread over one or more threads in a processor core. The prefetcher includes a prefetch request queue that tracks an amount of confirmations (i.e., actual demands for cache lines) observed for a given stream of data accesses. Further, the prefetch request queue maintains an amount of prefetch requests issued to memory for each stream and schedules subsequent requests to be issued.

In one embodiment, the prefetch request queue assigns a confidence level to each request. The confidence level may indicate a degree at which confirmations have been observed in a stream associated with that request. For example, if a relatively high number of confirmations is observed in a particular stream, requests associated with that stream may have a high confidence level. A high confidence level may indicate that the stream length is relatively large, and thus, the stream may benefit from prefetching data. As another example, if zero to a relatively small number of confirmations are observed in the stream, the requests associated with that stream may have a low confidence level. A low confidence level may indicate that the stream is recently established and may benefit from some prefetching or may indicate that the stream has little to no prefetching benefit (e.g., the stream is associated with a random access pattern workload, or the like).

In one embodiment, a memory controller in the computer system may determine which prefetch requests to service or drop based on a respective confidence level, prefetch utilization level, and current memory resource utilization. For example, if the memory resource utilization is currently high, the memory controller may determine to drop requests having a lower confidence level. The memory controller may adjust confidence level thresholds and prefetch utilization threshold based on the current memory resource utilization, such that the memory controller further drops lower confidence level requests as the memory resource utilization increases and/or drops prefetch requests when prefetched lines are not being utilized.

Further, the prefetcher includes a phase or confidence prediction component that maintains a confidence or phase counter for each thread executing in the processor. Each confidence or phase counter tracks the number of prefetch requests in a confident state (i.e., confidence levels exceeding a specified confidence or phase count threshold) and the number of prefetch requests in a non-confident state (i.e., confidence levels that do not exceed the specified confidence or phase count threshold). For example, the prefetcher may increment the thread-specific confidence or phase counter for each prefetch request in a confident state and decrement for each prefetch request in a non-confident state.

Further, the prefetcher includes a prefetch utilization component that maintains a prefetch utilization counter for each thread executing in the processor. Each prefetch utilization counter tracks the number of prefetched lines utilized. For example, the prefetcher may decrement the thread-specific prefetch utilization counter for each prefetch request sent to the memory controller and increment for each utilization of a prefetched cache line. Each prefetch utilization component may compare the number of utilized prefetched cache lines by its associated thread against one or more of the following: a number of prefetched cache lines requested by its associated core, a number of prefetched cache lines to be sent, a number of prefetched cache lines actually received.

The prefetcher may determine whether to increase or decrease a rate at which prefetches occur for a given stream based on the thread-specific confidence or phase counter, the prefetch utilization counter, as well as the current memory resource utilization. In one or more embodiments, the prefetcher may determine to select between one or more ramp modes based upon the confidence level of the prefetching thread (which in an aspect is a function of all the individual prefetch request confidences for the thread). In particular, the prefetcher may determine whether to select between one or more prefetching ramp modes, preferably at least two ramp modes, including for example selecting an aggressive, a conservative, or an ultra-conservative prefetching ramp mode to apply towards a given stream. For instance, the prefetcher may select an aggressive prefetching ramp mode for streams of a thread where the confidence or phase counter exceeds a (first) confidence or phase threshold. That is, a thread having a high confidence or phase counter, e.g., above a first confidence threshold, likely has a considerable amount of confirmations observed in the data stream(s) of the thread. Thus, prefetching at an aggressive rate may be beneficial for streams of such threads.

The prefetcher may select a conservative prefetching ramp mode for streams in a thread where the confidence or phase counter exceeds a (second) confidence or phase threshold (typically less than the confidence threshold for the aggressive prefetching ramp mode), or where the prefetch utilization exceeds a given prefetch utilization threshold, and when the current memory resource utilization is high. That is, a thread having a low confidence or phase counter and high prefetch utilization counter in memory constrained environments likely has fewer confirmations observed in the data stream(s) of the thread, but is benefiting from prefetching. That thread may have more streams that the prefetcher can track, resulting in fewer confirmations on any given stream, but high prefetch utilization for any prefetches actually sent out. Further, the prefetcher may select an aggressive ramp for such threads if the current memory resource utilization is low. That is, if memory utilization is low, bandwidth may be more efficiently used by advancing more streams through the prefetcher.

The prefetcher may select an ultra-conservative prefetching ramp mode for streams in a thread where the confidence or phase counter does not exceed a (second) confidence or phase threshold and where the prefetch utilization does not exceed the prefetch utilization threshold. That is, a thread having a low confidence or phase counter and low prefetch utilization counter likely has little to no confirmations observed in the data stream(s) of the thread, and prefetching of data may not be advantageous.

By assigning a confidence level to each prefetch request in a stream based upon the length/depth of the stream and by considering a rate of prefetch utilization, the prefetcher prioritizes streams that are likely to benefit from prefetching over streams where prefetching does not result in much performance benefit. Accordingly, the prefetcher may adaptively adjust rates at which prefetching for a given thread occurs. In addition, the memory controller can determine, based on confidence level, prefetch utilization, and memory utilization, prefetch requests to drop to conserve memory usage bandwidth.

The prefetcher in an embodiment further includes a mode governor to reduce or prevent the prefetcher from getting stuck in ultra-conservative mode. In an aspect, the mode governor optionally may also provide a smooth transition into and out of the different prefetching modes. In an embodiment, the prefetcher includes one or more probation states to transition the prefetcher between prefetching modes. The probation states issue prefetch requests similar to the existing conservative mode, but eventually transition the thread into a specific non-probation mode. In an embodiment, the prefetcher includes at least one, preferably two, probation states to transition between prefetching ramping modes. In an embodiment, the prefetcher includes two probation states, a UC probation state and a C probation state, that are controlled by a mode governor, and in an embodiment the UC probation state and C probation state transitions the prefetcher between ultra-conservative and conservative prefetching modes.

The prefetcher mode governor, in an aspect, facilitates and/or ensures that when transitioning between prefetching ramp modes, e.g., from conservative to ultra-conservative mode, the prefetcher enters a first probation state, e.g., UC probation state, where the prefetcher allocates new streams as if in the more aggressive prefetching ramp mode, e.g., the conservative prefetching ramp mode, even though the prefetching ramp mode criteria call for prefetching in the less aggressive prefetching ramp mode, e.g., the ultra-conservative prefetching ramp mode, (e.g., the confidence or phase predictor and prefetch utilization are below conservative threshold).

The probation states in embodiments include timers that count the number of cycles, and which in an aspect defines when the prefetcher may exit the probation state. That is, a counter threshold can be set (predetermined, selected, adjustably selected or determined, programmed, etc.) and after the counter counts to the threshold number of cycles the mode governor in a ramp selector can transition to a new prefetching ramp mode or probation state. For example, the UC probation state may include a counter that counts a number of cycles after which the prefetcher exits the UC probation state, and in an aspect enters the ultra-conservative prefetching ramp mode.

In addition, optionally, the prefetcher in an embodiment may transition from the first probation state, e.g., the UC probation state, to a second probation state, e.g., the C probation state. For example, if while in the first probation state, e.g., UC probation state, the confidence counter of the associated thread exceeds the confidence threshold required to enter a different prefetching mode, e.g., the conservative prefetching ramp mode, the prefetcher, e.g., the mode governor in the ramp selector in the prefetcher, can select and apply the second probation state criteria, e.g., the C probation state prefetching criteria. Optionally, if while in the first probation state, e.g., UC probation state, the prefetch utilization level of the associated thread exceeds the prefetch utilization threshold required to enter a different prefetching mode, e.g., the conservative prefetching ramp mode, the prefetcher, e.g., the mode governor in the ramp selector in the prefetcher, can select and apply the second probation state criteria, e.g., the C probation state prefetching criteria.

The prefetcher mode governor, in an embodiment, provides a process and technique whereby the prefetcher exits the first probation state or ultra-conservative mode and enters the second probation state, e.g., C probation state, after a number of cycles. Periodically exiting the ultra-conservative mode gives threads that might not otherwise meet the criteria to leave the ultra-conservative prefetching ramp mode a chance to send out prefetches and, if they meet the criteria, transition out of the ultra-conservative prefetching ramp mode (e.g. to the conservative or aggressive prefetching mode).

The prefetcher in an embodiment may stay in the second probation state, e.g., C probation state for a number of cycles. While in the second probation state, e.g., C probation state, the prefetcher preferably allocates in a different prefetching mode and according to different principles, rules, and logic. For example, while in the C probation state, whether exiting from the ultra-conservative prefetching mode or the first probation state, e.g., UC probation state, the prefetcher allocates in conservative mode, and preferably the prefetcher can not be overridden while in C probation state to prefetch in a third prefetching mode, e.g., aggressive prefetching mode. In this manner, a smooth transition is provided between prefetching modes, for example, between ultra-conservative prefetching mode and aggressive prefetching mode.

Advantageously, techniques presented herein allow a processor to optimize prefetch efficiency relative to current memory resource utilization and constraints. Providing at least one, and preferably two probation states—UC probation state upon entry into ultra-conservative state, and C probation state upon leaving ultra-conservative state—and a prefetcher mode governor in an aspect to enforce that each thread spends some time in these probationary states before entering or after exiting the ultra-conservative mode provides smooth entry and exit from the ultra-conservative mode. The prefetcher mode governor and methods also permit periodically exiting from the ultra-conservative mode to give restricted threads the opportunity to send out prefetches and transition out of ultra-conservative mode (e.g. to the conservative or aggressive prefetching mode). In addition, in an aspect, because the thread moves to the probation state, e.g., C probation state, instead of immediately to a base prefetching ramp mode, e.g., conservative prefetching ramp mode, a truly prefetch averse workload is not at risk of bursts of prefetches that waste memory bandwidth.

FIG. 1 illustrates an example computing system 100 configured with a processor that identifies data streams that benefit from prefetching based on stream depth and memory bandwidth constraints, according to one embodiment. As shown, the computing system 100 further includes, without limitation, a network interface 115, a memory 120, and a storage 130, each connected to a bus 117. The computing system 100 may also include an I/O device interface 110 connecting I/O devices 112 (e.g., keyboard, display, and mouse devices) to the computing system 100. Further, in context of the present disclosure, the computing system 100 is representative of a physical computing system, e.g., a desktop computer, laptop computer, etc. Of course, the computing system 100 will include a variety of additional hardware components.

The processor 105 retrieves and executes programming instructions stored in the memory 120 as well as stores and retrieves application data residing in the storage 130. The bus 117 is used to transmit programming instructions and application data between the processor 105, I/O device interface 110, network interface 115, memory 120, and storage 130. The memory 120 is generally included to be representative of a random access memory. The memory 120 stores program instructions and operand data used by the processor 105. The storage 130 may be a combination of fixed and/or removable storage devices, such as fixed disc drives, removable memory cards, or optical storage, network attached storage (NAS), or a storage-area network (SAN).

Figure 2:
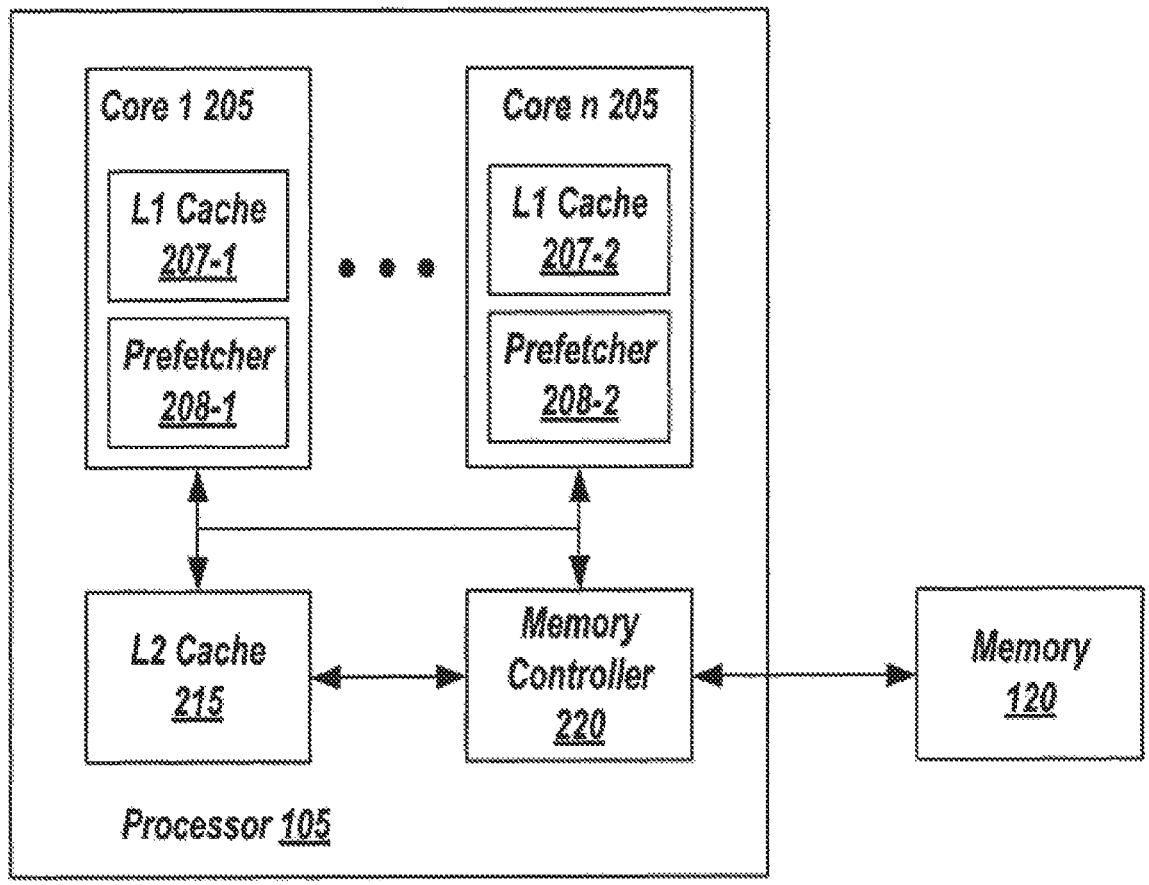
FIG. 2 further illustrates the processor described relative to FIG. 1, according to one or more embodiments.

FIG. 2 further illustrates the processor 105 configured to identify data streams that are likely and unlikely to benefit from prefetching based on stream depth, prefetching utilization, and memory resource utilization, according to one embodiment. As shown, the processor 105 includes one or more cores, from core 1 205 to core n 205, a Level 2 (L2) cache 215, and a memory controller 220. Of course, the processor 105 may include a variety of additional components.

As shown, the cores 205 each include a Level 1 (L1) cache 207, and a prefetcher 208. For example, core 1 205 includes a L1 cache 207-1 and a prefetcher 208-1 and core n 205 includes a L1 cache 207-n and a prefetcher 208-n. Hereinafter a generic reference to either prefetcher 208-1 or prefetcher 208-n may be referred to as prefetcher 208 and a generic reference to either L1 cache 207-1 or L1 cache 207-n may be referred to as L1 cache 207.

The prefetcher 208 identifies and prefetches access patterns of the memory 120. Further, the prefetcher 208 manages a cache structure for prefetch streams, e.g., on the L1 cache 207. Further still, the prefetcher 208 predicts which of the streams will be required by the processor 105.

The L1 caches 207 and L2 cache 215 may include separate instruction and data caches implemented using high speed memory devices. The caches 207 and 215 may temporarily store values that might be repeatedly accessed by the processor 105 to more quickly process data, e.g., by avoiding loading values directly from the memory 120. Additional cache levels (e.g., a Level 3 (L3) cache) may be provided. Each cache level from highest (L1) to lowest (L3) may successively store more information, but at a longer access penalty. Further, each cache includes a number of memory blocks that individually store various instructions and data values. A cache line, or a memory block in the cache, can include a variety of fields, such as an address field and a value field.

The prefetcher 208 prefetches data from established streams. To do so, the prefetcher 208 may include logic that detects monotonically increasing or decreasing sequences of demand accesses to cache lines having a common address spacing. Once established, an initial access to the stream is referred to as an allocation. Further, each subsequent access to that stream (i.e., an actual demand for a given cache line) is referred to as a confirmation. A depth or confidence level associated with a stream is based on the amount of confirmations observed in the stream.

As further described below, the prefetcher 208 may assign a confidence level to each prefetch request for a given stream. The confidence level may be based on a length/depth of a stream associated with a request, as the stream length/depth indicates how many sequential demand load instances are observed in the stream. The prefetcher 208 may assign a low confidence level to a request associated with a stream having a relatively low amount of confirmations. The confidence level may be higher with a greater amount of confirmations observed in the stream. A high confidence level indicates that the data requested by the particular prefetch request is likely to be required by the processor 105.

In one embodiment, the memory controller 220 is configured to receive prefetch requests from prefetcher 208. The memory controller 220 may determine based on confidence levels, prefetch utilization, and memory utilization whether to drop requests or honor prefetch requests. For example, in the event that memory bandwidth is constrained, the memory controller 220 may drop certain prefetch requests. And, as the memory bandwidth becomes more constrained, the memory controller 220 may decide to only honor prefetch requests of the highest confidence level. In one embodiment, the memory controller 220 may evaluate a memory utilization threshold profile to determine which level requests to drop based on current memory utilization. The memory utilization threshold profile may be based on memory utilization over an amount of past cycles. For instance, if memory resource utilization was relatively low during the past "x" amount of cycles, the memory controller 220 may honor lower confidence level prefetch requests. In practice, a memory utilization threshold profile based on utilization during the past 1,000 cycles has been shown to be effective. Different amounts of past cycles are contemplated, which may be predetermined, adjustably selected, etc.

Further, the prefetcher 208 may maintain a confidence or phase counter for each thread executing in the processor 105. The confidence or phase counter tracks requests in a confident state (i.e., having a confidence level that exceeds a given confidence or phase threshold) and those in a non-confident state. For example, the confidence or phase counter may increment each time the prefetcher 208 observes a request in a confident state and decrement each time the prefetcher 208 observes a request in a non-confident state. As further described below, the prefetcher 208 may predict well-performing streams based on the confidence or phase counter. Doing so allows the prefetcher 208 to determine which streams to aggressively ramp based on the prediction.

Further, the prefetcher 208 may maintain a prefetch utilization counter for each thread executing in the processor 105. The prefetch utilization counter tracks the number of used (i.e. accessed by a demand request) prefetched cache lines. For example, the prefetch utilization counter may be incremented when a prefetched cache line is used and decremented when a prefetch request is sent to memory. As further described below, the prefetcher 208 may predict under-performing streams based on the prefetch utilization counter. Doing so allows the prefetcher 208 to determine which streams to ultra-conservatively ramp based on the prediction.

Figure 3:
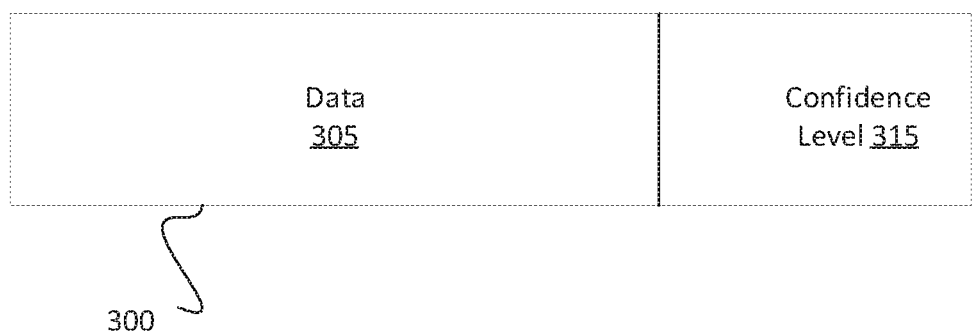
FIG. 3 illustrates an exemplary prefetch request that includes a field specifying a confidence level associated with the request, according to one or more embodiments.

FIG. 3 illustrates an example prefetch request 300 that includes a field specifying a confidence level associated with the request, according to one embodiment. As shown, the prefetch request 300 includes request data 305 and a confidence level 315. The request data 305 may specify information associated with the request, such as a data address, thread identifier, stream identifier, and a prefetch source.

As stated, the prefetcher 208 may add a confidence level to each request 300 based on a length/depth (i.e., a number of confirmation accesses) of a stream. In one embodiment, the confidence level 315 is a 2-bit field representing levels 0-3, where confidence level 0 represents the lowest confidence level and where confidence level 3 represents the highest confidence level.

Each level may be associated with a specified amount of confirmations. For instance, prefetch requests of confidence level 0 may be associated with streams that have zero to one confirmations. In such a case, the stream may only have an allocation access and one confirmation (i.e., the stream depth is low). Prefetch requests of confidence level 1 may include up to four confirmations, and prefetch requests of confidence level 2 may include up to eight confirmations. Prefetch requests of confidence level 3 may have greater than eight confirmations. Such confidence level 3 requests may be indicative of sections in code that may benefit from aggressive prefetching. Various components of the prefetcher 208 may evaluate stream performance based on confidence levels of the requests and act in response to such an evaluation, e.g., prioritizing certain streams over others. Likewise, the memory controller 220 may determine which requests to prioritize based on current memory resource utilization.

Figure 4:
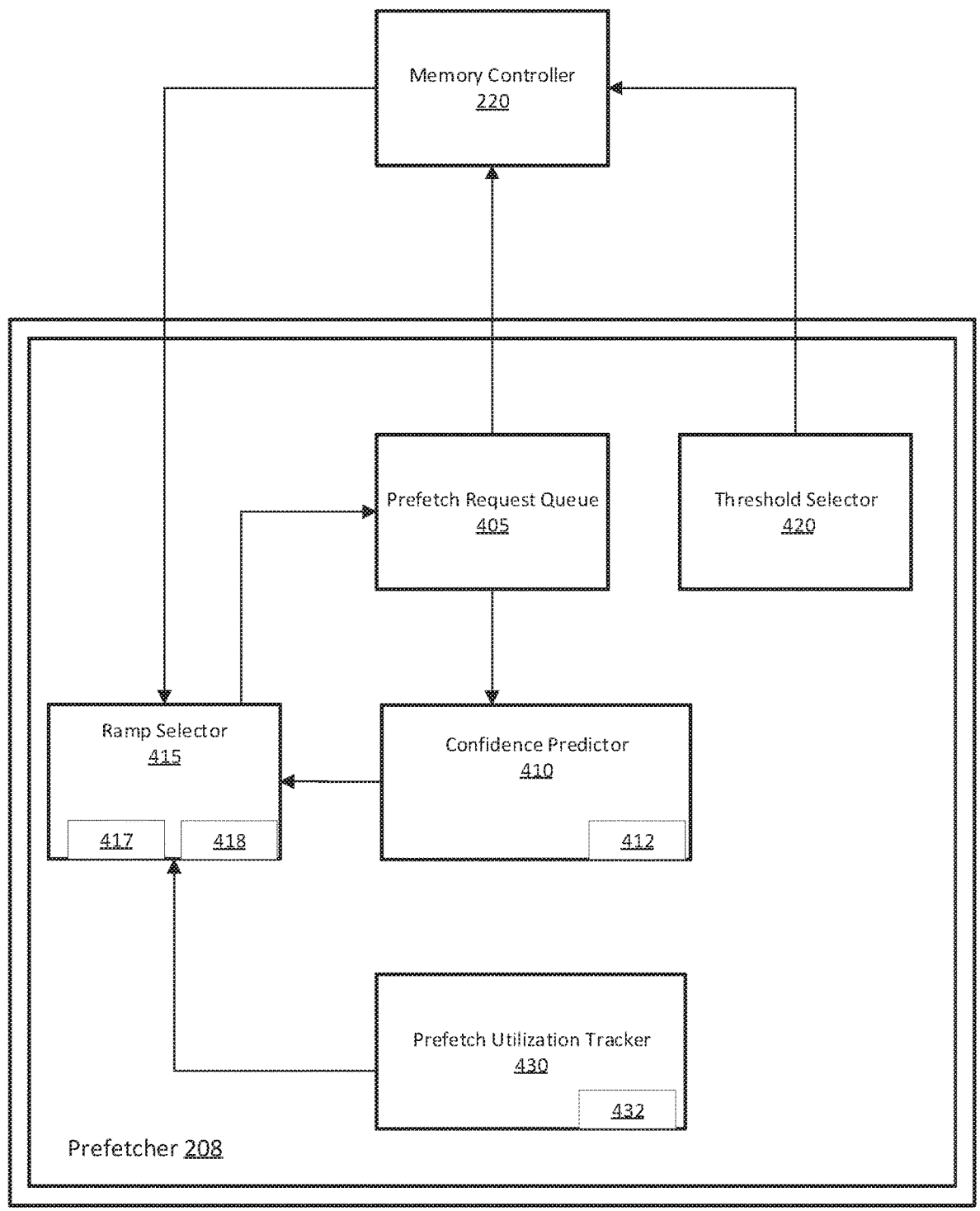
FIG. 4 illustrates an exemplary prefetcher, according to one or more embodiments.

FIG. 4 illustrates an exemplary prefetcher 208, according to one embodiment. As shown, the prefetcher 208 further includes a prefetch request queue 405, a phase or confidence predictor 410, a ramp selector 415, a threshold selector 420, a prefetch utilization tracker 430.

In one embodiment, the prefetch request queue 405 is a tracking mechanism that tracks S streams of data accesses over T threads in a core 205. The prefetch request queue 405 maintains an amount of confirmations (i.e., actual demands for prefetched lines) observed in each of the streams. Further, the prefetch request queue 405 tracks an amount of prefetch requests issued for each stream and schedules a next appropriate prefetch request to be sent to the memory 120.

Further still, the prefetch request queue 405 may evaluate a stream length/depth associated with each outgoing prefetch request. Doing so allows the prefetch request queue 405 to add a confidence score to each outgoing request. The prefetch request queue 405 may then send each request to the memory controller 220. Based on an amount of requests that are already in a memory access queue, the confidence level of an incoming request, and prefetch utilization, the memory controller 220 may decide whether to drop or honor the request. In addition, the threshold selector 420 may send a threshold memory utilization profile to the memory controller 220 that is based on historical memory resource utilization (e.g., from the past x cycles). For instance, the memory utilization threshold profile may indicate that over the last 1,000 cycles, memory resource utilization was relatively low. In such a case, the memory controller 220 may decide to honor prefetch requests at a lower memory utilization threshold (e.g., given that current memory resource utilization is also relatively low).

The prefetch request queue 405 may also send confidence information to the confidence or phase predictor 410. The confidence or phase predictor 410 maintains thread-specific confidence or phase counters 412 (not shown in FIG. 4) that track confidence levels of requests for streams observed in each thread. For instance, the confidence or phase predictor 410 may increment the thread-specific counter 412 for each confident state request (i.e., requests having a confidence level that exceeds a specified threshold) and decrement the counter for each non-confident state request that the prefetcher 208 sends out. A relatively high confidence or phase count can indicate that the thread is in a section of code that can benefit from prefetching.

The prefetch utilization tracker 430 maintains thread-specific prefetch utilization counters 432 that track the number of prefetched cache lines used. For example, the prefetch utilization tracker 430 may increment the prefetch utilization counter 432 when a prefetched cache line is used and may decrement the prefetch utilization counter 432 when a prefetch request is sent to memory. As further described below, the prefetcher 208 may predict underperforming streams based on the prefetch utilization counter 432. A relatively high prefetch utilization count in association with a relatively low confidence or phase counter value can indicate that the thread is in a section of code where accesses to the memory 120 are moderately random and thus likely to benefit from some prefetching, but unlikely to benefit from aggressive prefetching. A relatively low prefetch utilization count can indicate that the thread is in a section of code where accesses to the memory 120 are mostly random and thus unlikely to benefit from even judicious prefetching.

The phase predictor 410 may forward confidence or phase counter 412 information and the prefetch utilization tracker 430 may forward prefetch utilization counter information to the ramp selector 415. The ramp selector 415 may determine based on one or more criteria, e.g., the confidence or phase counter 412, the prefetch utilization counter 432, and current memory resource utilization (retrieved from the memory controller 220), whether to increase or decrease a rate at which prefetches occur at a given stream. For example, the ramp selector 415 may select an aggressive prefetching ramp mode for streams of a thread based upon one or more criteria, e.g., the confidence or phase counter 412 exceeding a first confidence or phase threshold. That is, a thread associated with a high confidence or phase counter 412, likely has a considerable amount of confirmations observed in the data stream(s) of the thread. Thus, prefetching at an aggressive rate may be beneficial for streams of such threads, due to the likelihood that the associated thread is in a section of code where memory access is sequential. The ramp mode in an embodiment is based upon the confidence level of the prefetching thread.

The ramp selector 415 includes a state machine or mode governor 417 to control the prefetching principles, rules and logic applied for a particular prefetching ramp mode or probation state. In the aggressive prefetching ramp mode, in an aspect, the principles, rules and logic require every memory access that does not match an existing prefetch stream to be assumed to be the start of a new prefetch stream and results in multiple prefetches being sent out before any confirmation is seen. After confirmations are seen, the prefetcher in the aggressive mode continues to ramp up aggressively.

The ramp selector 415 may select a conservative prefetching ramp mode for streams in a thread according to different criteria than the aggressive prefetching ramp mode, e.g., where the confidence or phase counter 412 exceeds the second (lower) confidence threshold (but not the first (higher) confidence threshold), or where the prefetch utilization exceeds a given prefetch utilization threshold, (and/or the current memory resource utilization is high). That is, a thread associated with a low confidence or phase counter 412 and high prefetch utilization counter 432 likely has fewer confirmations observed in the data stream(s) of the thread and the ramp selector 415 in an embodiment selects the conservative prefetching ramp mode. Doing so allows the processor 105 to conserve memory bandwidth when such memory resources are constrained. In the conservative prefetching ramp mode, the state machine or mode governor applies different principles, rules, and logic where for example every memory access is treated as a potential start of a stream and only a few prefetch requests are sent out before a confirmation is seen, and in an embodiment, only one prefetch request is sent out before a confirmation. After confirmations are seen, in the conservative prefetching mode, the prefetcher starts ramping up aggressively. Further, the prefetcher may select an aggressive ramp for these types of threads (e.g., where first (higher) phase threshold not exceeded and prefetched utilization threshold is exceeded) if the current memory resource utilization is low. That is, if memory utilization is low, bandwidth may be more efficiently used by advancing streams more rapidly through the prefetcher.

The ramp selector 415 may select an ultra-conservative prefetching ramp mode for streams in a thread where the confidence or phase counter 412 does not exceed a second confidence or phase threshold (typically less than the first confidence threshold) and where the prefetch utilization does not exceed a prefetch utilization threshold. That is, a thread associated with a low confidence or phase count from counter 412 and low prefetch utilization count from counter 432, likely has little to no confirmations observed in the data stream(s) of the thread. In the ultra-conservative prefetching mode, in an aspect, the state machine or mode governor applies different principles, rules, and logic than in the other prefetching modes, and, for example, every access is assumed not to be prefetchable and no speculative prefetches are sent. In the ultra-conservative mode the prefetcher in an embodiment waits for several further confirmations (e.g., 2-3 confirmations) before sending out a large number of prefetch requests.

The ramp selector may have more or less modes of prefetching that are governed by different or additional principles, rules, and or logic. For example, the ramp selector 415 may have modes other than or in addition to aggressive prefetching mode, conservative prefetching mode and/or ultra-conservative prefetching mode.

The ramp selector 415 may further include a prefetch mode governor to control transitioning between one or more modes of prefetching. The prefetch mode governor 417 may be part of the state machine that governs and controls the prefetching modes, e.g., the aggressive prefetching mode, the conservative prefetching mode, the ultra-conservative prefetching mode, or one or more other modes of prefetching, as well as one or more probation states. The ramp selector 415 in an embodiment includes a prefetch mode governor 417 to control transitioning between one or more prefetching ramp modes, and in the example discussed herein, between a conservative prefetching ramp mode and an ultra-conservative prefetching ramp mode for streams in a thread. The state machine in the ramp selector 415, in addition to the various modes of prefetching, in an embodiment includes at least one probation state. The ramp selector 415 in one or more embodiments preferably includes two probation states, UC probation state which is used on entry to the ultra-conservative ramping mode from the conservative prefetching ramp mode, and C probation state which is used on exiting the ultra-conservative ramping mode. The prefetch mode governor 417 in an aspect enforces that each thread spends some time in the one or more probationary states when transitioning in and out of one or more prefetching ramp modes, e.g., ultra-conservative prefetching ramp mode.

The prefetch mode governor 417 also in an embodiment provides an opportunity for streams in a prefetching ramp mode, e.g., an ultra-conservative ramp mode, to periodically leave that prefetching ramp mode, e.g., the ultra-conservative prefetching mode, to take advantage of prefetching under different criteria and not be stuck in a particular prefetching ramp mode, e.g., ultra-conservative ramping mode. The prefetch mode governor 417 includes a mode governor counter 418 for counting cycles in probationary states and one or more prefetching ramp modes, e.g., the ultra-conservative prefetching mode. In an embodiment, a single mode governor counter 418 is used in the one or more probationary states and in at least one prefetching ramp mode, e.g., the ultra-conservative mode, as explained in more detail below.

Figure 5:
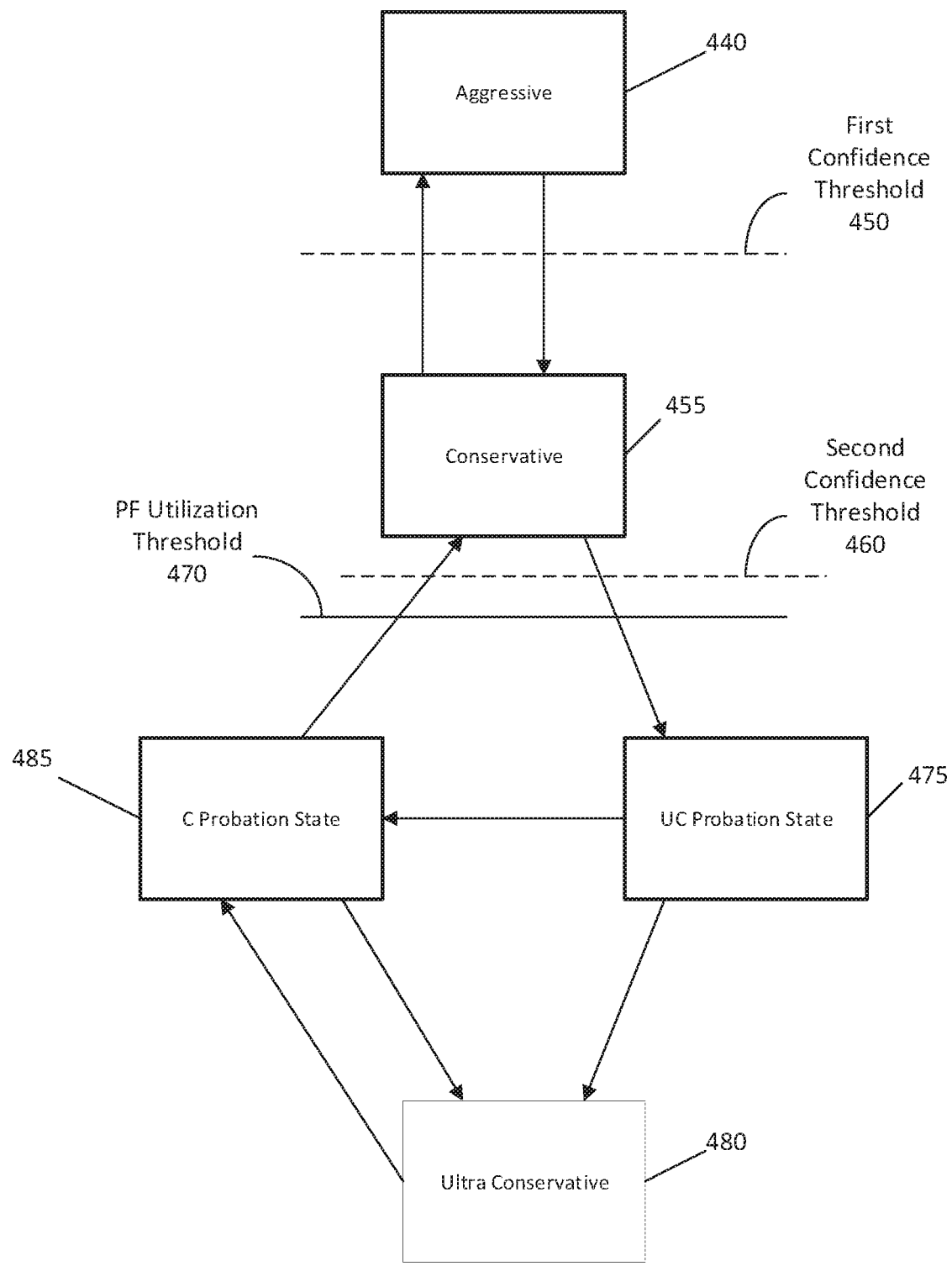
FIG. 5 illustrates an exemplary scheme showing a prefetcher ramping mode, according to one or more embodiments.

FIG. 5 illustrates a block diagram of an exemplary system and/or scheme for ramp selector 415 to select a particular ramp for a stream based upon the confidence counter 412, based upon a first, e.g., an aggressive, confidence threshold 450, and based upon a second, e.g., an ultra-conservative, confidence threshold 460. The first aggressive confidence threshold 450 is a predetermined or selected confidence counter 412 value that establishes a minimum confidence level of the prefetching thread for the aggressive ramp to be selected for the stream. If the confidence counter 412 is above the first aggressive confidence threshold 450, the ramp selector 415 is allowed to select the aggressive ramp for the stream. For example, a stream with many confirmations and corresponding high confidence level may have a confidence counter 412 above the first aggressive confidence threshold 450 and the aggressive ramp mode may be selected as a result.

If the confidence counter 412 is below the first aggressive confidence threshold 450, the ramp selector 415 in an embodiment is prevented from selecting the aggressive ramp for the stream, except in an aspect when memory 120 utilization is low. For example, a stream with few confirmations and a corresponding low confidence level may have a confidence counter 412 below the first aggressive confidence threshold 450 and the aggressive ramp may be disallowed. However, in certain embodiments, when memory 120 utilization is low, the aggressive ramp may be selected for the stream with few confirmations, a corresponding low confidence level, and confidence counter 412 below the first aggressive confidence threshold 450.

In an embodiment, the prefetcher 208 may transition from conservative prefetching mode 455 to aggressive prefetching mode 440 where the confidence counter 412 is above a first confidence threshold (an aggressive confidence threshold 450) or where memory bandwidth is not constrained. Similarly, if prefetcher 208 is operating in aggressive prefetcher mode 440, the prefetcher 208 may select conservative mode 455 where the confidence counter 412 falls below the first aggressive threshold 450, and memory bandwidth is constrained.

A second (ultra-conservative) confidence threshold 460 is a predetermined confidence counter 412 value that establishes a minimum confidence value for the conservative ramp to be selected for the stream. If the confidence counter 412 is below the second (ultra-conservative) confidence threshold 460, the ramp selector 415 is allowed to select the ultra-conservative ramp for the stream. For example, a stream with very few confirmations and corresponding low confidence level may have a confidence counter 412 below the second (ultra-conservative) confidence threshold 460 and the ultra-conservative ramp mode may be selected. If the confidence counter 412 is above the second (ultra-conservative) confidence threshold 460, the ramp selector 415 in an embodiment is prevented from selecting the ultra-conservative ramp for the stream.

FIG. 5 also illustrates a block diagram of an exemplary system and/or scheme for ramp selector 415 to select a particular ramp for a stream based upon the prefetch utilization counter 432 and based upon a prefetch utilization threshold 470. If the prefetch utilization counter 432 is below the prefetch utilization threshold 470, the ramp selector 415 is allowed to select the ultra-conservative ramp for the stream. If the prefetch utilization counter 432 is above the prefetch utilization threshold 470, the ramp selector 415 is prevented from selecting the ultra-conservative ramp for the stream.

FIG. 5 also illustrates a block diagram of an exemplary logic system and/or scheme for ramp selector 415 to select a particular prefetcher ramp mode based upon confidence counter 412 and one or more confidence thresholds, e.g., confidence thresholds 450 and 460, prefetch utilization counter 432 and a prefetch utilization threshold, e.g., prefetch utilization threshold 470, and in an aspect memory utilization. In an embodiment, prefetcher 208 may transition from conservative prefetching mode to UC probationary state 475. The prefetcher 208 in an embodiment transitions to or enters the UC probationary state 475 where the confidence predictor, e.g., confidence counter 412, falls below second confidence threshold, e.g., ultra-conservative confidence threshold 460, and prefetch utilization counter 432 falls below a prefetch utilization threshold.

In UC probationary state 475, the memory is assumed to be busy and the prefetcher continues to allocate according to the principles, rules, and logic set forth for conservative prefetching mode 455, even though the confidence predictor and prefetch utilization indicate an ultra-conservative prefetching mode should be employed. The UC probationary state employs a counter, e.g., mode governor counter 418, and the mode governor counter 418 counts N cycles when the prefetcher enters the UC probationary state. The mode governor counter 418 may count up or down N cycles, where N cycles is selected to define the length of time, e.g., number of cycles, the prefetcher can stay in the UC probationary state until it transitions and changes to the ultra-conservative mode 480. The number N may be on the order of thousands of cycles to tens of thousands of cycles (e.g., 1,000-10,000 cycles), although other values of N are contemplated and will be based upon the desired results.

If while prefetcher 208 is in UC probation state, either the confidence predictor exceeds the second (ultra-conservative) confidence threshold 460, or the prefetch utilization exceeds the prefetch utilization threshold 470, the prefetcher transitions or changes to C probation state 485. If governor mode counter 418 counts down N cycles, where N can be any number, while the prefetcher 208 is in UC probation state 475, in an embodiment, the prefetcher state machine changes to ultra-conservative prefetcher ramp mode 480. In ultra-conservative prefetching mode 480, the prefetcher allocates according to the principles, rules, and logic set for the ultra-conservative prefetcher ramp mode.

When the prefetcher 208 enters the ultra-conservative ramp mode 480 from the UC probation state 475, the ultra-conservative mode 480 employs an ultra-conservative counter, e.g., mode governor counter 418, and the mode governor counter 418 counts M cycles. That is, when the prefetcher enters the ultra-conservative mode 480 a counter is started and counts M cycles, and if the prefetcher is still in ultraconservative mode 480 after M cycles, the prefetcher 208 changes or transitions to C probation state 485. M cycles is selected to define a length of time, e.g., a number of cycles, that the prefetcher stays in ultra-conservative mode until it changes to C probation state 485 so that a stream that might not otherwise exit ultra-conservative mode has the opportunity to send out some prefetches and exit ultra-conservative mode 480. The number M is generally more than N cycles that the prefetcher stays in the UC probation state, and may be on the order of tens of thousands to hundreds of thousands of cycles, e.g., 10,000 to 990,000 cycles, although other values of M are contemplated and will depend upon the desired results.

In addition, in an aspect, if the prefetcher 208 is operating in ultra-conservative prefetch mode 480, the prefetcher ramp mode transitions or changes to C probation state 485 if the confidence predictor exceeds the second confidence threshold, e.g., the ultra-conservative confidence threshold 460, or if the prefetch utilization is above a prefetch utilization threshold, e.g., prefetch utilization threshold 470.

In an embodiment, when the prefetcher is operating in C probation state 485, the prefetcher prefetches according to different principles, rules, and logic than when the prefetcher is in the ultra-conservative prefetching mode. In an embodiment, while in the C probation state 485 memory is assumed busy and the prefetcher allocates as if it is operating in conservative prefetcher mode 455, but the conservative allocation criteria cannot be overridden while in C probation state 485 to aggressive allocation mode. Even if the memory bandwidth is not constrained, in C probation state, in an aspect, the prefetcher will only allocate as if in conservative mode 455.

The prefetcher operating in C probation state 485 can transition or change back to ultra-conservative prefetcher mode 480, or change or transition to conservative prefetcher mode 455. When the prefetcher enters C probation state 485, a counter starts counting P cycles. In an embodiment, mode governor counter 418 counts P cycles when the prefetcher 208 enters the C probation state 485. P cycles defines the length of time that the prefetcher stays in C probation state before the prefetcher can change to conservative mode 455 or back to ultra-conservative mode. C can be on the order of thousands of cycles, e.g., 1,000-10,000 cycles, although other cycle amounts are contemplated for P depending upon the desired result.

If the mode governor counter 418 counts down P cycles and either the confidence predictor exceeds a confidence threshold value, e.g., second (ultra-conservative) confidence threshold 460, or the prefetch utilization exceeds a prefetch utilization threshold value, e.g., prefetch utilization threshold 470, then the prefetcher changes to conservative prefetching mode 455. If the C probation counter, e.g., mode governor counter 418, counts P cycles and the confidence predictor is below a confidence threshold value, e.g., second (ultra-conservative) confidence threshold 460, and the prefetch utilization is below a prefetch utilization threshold value, e.g., prefetch utilization threshold 470, the prefetch changes or transitions back to ultra-conservative mode 480, whereupon the ultra-conservative counter restarts counting to M cycles, and the prefetcher allocates according to ultra-conservative principles, rules, and logic.

In another aspect, if the prefetcher 208 is operating in C probation state 485, the prefetcher mode can transition or change to ultra-conservative prefetching mode or conservative prefetching mode according to a scenario. More particularly, in an embodiment, the confidence counter 412 is set to some value A above the second confidence threshold, e.g., above ultra-conservative threshold 460, and the prefetch utilization counter is set to some value B over the prefetch utilization threshold, e.g., above prefetch utilization threshold 470. The prefetcher will fall back into the ultra-conservative prefetching ramp mode if both counters fall back below their respective threshold values, e.g., below second confidence threshold 460 and below prefetch utilization threshold 470. If after P cycles, either the confidence level exceeds the second confidence threshold, or the prefetch utilization exceeds the prefetch utilization threshold, then the prefetcher changes to conservative prefetch mode.

In an embodiment, the prefetch utilization counter 432 may track a ratio that indicates the number of used prefetched cache lines in a stream against one or more of the following (a) the total number of cache lines in the stream that are to be prefetched by prefetcher 208, (b) the number of requested cache lines that need to be fetched from memory 120, and/or (c) the number of cache lines actually returned by memory 120. For example, the prefetcher 208 receives or generates a request or function to prefetch one hundred (100) cache lines within a particular data stream. Of these one hundred (100) cache lines, seventy (70) of the cache lines hit (i.e. are already located within a cache of processor 105 (e.g., a last level cache, etc.)) and the remaining thirty (30) of the cache lines are not located within the caches of processor 105. Therefore, prefetcher 208 may request thirty (30) of the cache lines from memory 120. However, memory 120 declines twenty (20) of the thirty (30) requested cache lines and returns only ten (10) of the thirty (30) requested cache lines. Therefore, in the present example, the value of (a) is one hundred (100), the value of (b) is thirty (30), and the value of (c) is ten (10).

The terms, "used prefetched cache line," "cache line is utilized," or the like is defined to mean either (a) that a demand load hit a cache line requested by prefetcher 208 within a cache (e.g. last level cache, etc.) of processor 105, (b) a requested cache line by prefetcher 208 hit against an outstanding prefetch miss (i.e. the requested cache line is not yet in the processor 105 cache but is in route thereto), or (c) a confirm would have been seen against a stream where a prefetch is not allowed if prefetching would have been allowed to occur. As such, in embodiments, each instance where (a), (b), or (c) occur, the prefetch utilization counter 432 may be incremented.

Generally, a ramp specifies a quantity or rate of prefetch request(s) by prefetcher 208 for data within a given stream until steady state is reached. When the stream is initially accessed, the access is referred to as an allocate. Further, each subsequent access to that stream (i.e., an actual demand for a given cache line) is a confirmation. The prefetcher 208 may determine whether to issue a request to prefetch data from the given stream based on the prefetcher ramp mode selected for that stream.

The aggressive prefetcher ramp mode in an exemplary embodiment specifies that one or more prefetch requests for data from the stream is allowed per allocation of the stream and per each subsequent confirm of the stream, until steady state is reached. For example, at a particular instance, a stream has been allocated and has nine subsequent confirms. The aggressive ramp may indicate that five prefetch requests are allowed per allocate and per each confirm. Therefore, at this instance, for this given stream and for such specification of the aggressive ramp, the prefetcher 208 is allowed fifty prefetch requests for data within the stream (i.e., five prefetch requests per allocate and five prefetch requests per each confirm). At a subsequent instance, another confirm has been established and, as a result, the prefetcher 208 is allowed an additional five prefetch requests for data from the stream.

The conservative ramp mode in an exemplary embodiment specifies that only one prefetch request for data from a stream is allowed per allocation and only one prefetch request for data from the stream per the next "n" number of confirms, and is followed by the aggressive ramp until steady state is reached. For example, a stream has been allocated and has four subsequent confirms prior to steady state. The conservative ramp may indicate that one prefetch request is allowed per allocate and per each of the next two confirms. Subsequent to the next two confirms, the aggressive ramp allows for five prefetch requests for each next confirm. In other words, thirteen prefetch requests are allowed based upon one request per allocate and per each of the next two confirms and based upon five requests per each of the next two confirms. Therefore, for this given stream and for such specification of the conservative ramp, the prefetcher 208 is allowed to prefetch thirteen requests for data within the stream.

The ultra-conservative ramp mode in an exemplary embodiment specifies that no prefetch requests for data from a stream are allowed per the allocation and "m" number of confirms and is followed by the conservative ramp and is subsequently followed by the aggressive ramp, until steady state is reached. For example, a stream has been allocated and has five subsequent confirms prior to reaching steady state. The ultra-conservative ramp may indicate that no prefetch requests are allowed per allocate and per next two confirms. In other words, the ultra-conservative ramp may indicate that a prefetch request is not allowed for the first three accesses of the stream. The conservative ramp may indicate that one prefetch request is allowed per each next two confirms and the aggressive ramp allows for five prefetch requests per each subsequent confirm. In other words, seven prefetch requests are allowed based upon no allowed requests per allocate and per next two confirms, based upon one allowed request per each of the next two confirms, and based upon five allowed requests per the last confirm.

There may be more or fewer prefetching ramp modes, and the prefetching ramping modes may be governed by different criteria, and may prefetch according to different principles, rules, and logic. While only three prefetching ramp modes have been described, it can be appreciated that more or fewer prefetching ramp modes may be utilized and the various prefetching modes may be governed by different criteria, and apply different principles, rules and logic to ramping prefetch requests. Likewise, one or more probation states may be utilized and be governed by different criteria, and apply different principles, rules, and logic to ramping prefetch requests.

Figure 6:
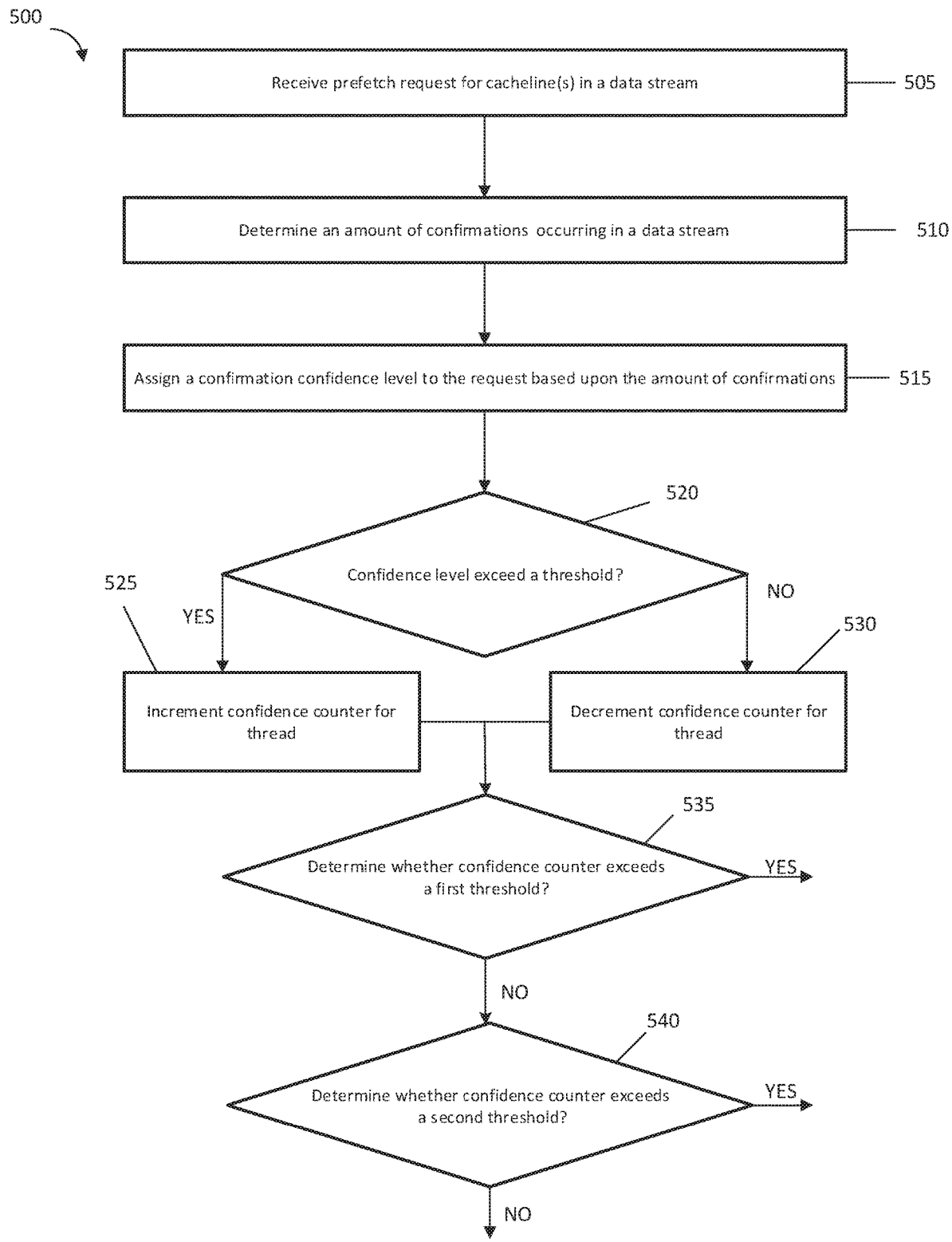
FIG. 6 illustrates a method for adjusting a phase or a confidence level count, according to one or more embodiments.

FIG. 6 illustrates a method 500 for determining a confidence level of a prefetch request, according to one or more embodiments. As shown, the method 500 begins at step 505, where a prefetch request or prefetch function for cache line(s) in a data stream is received or generated, preferably by the prefetch request queue 405. At step 510, an amount of data stream confirmations is determined preferably by the prefetch request queue 405. At step 515, a confidence level to the request based on the number of confirmations is assigned, preferably by prefetch request queue 405. At 520, whether the confidence level exceeds a predetermined confidence level threshold is determined, preferably by the prefetch request queue 405. In an embodiment, it can be determined whether or not the confidence level exceeds one or more thresholds, including in an embodiment whether the confidence threshold 450 and/or confidence threshold 460 are exceeded. If the confidence level of the request exceeds a specified first confidence level threshold, then the request has a high confidence level. In contrast, if the confidence level of the request does not exceed the first confidence level threshold, but does exceed a second confidence level threshold, then the request has a mid-confidence level, and if the confidence level of the request does not exceed the second confidence level threshold, then the request has a low confidence level.

In an embodiment, if the confidence level exceeds the confidence level threshold, then the request is in a confident state. In such a case, at step 525, the confidence predictor 410 increments a thread-specific confidence counter 412 associated with that thread. However, if the confidence level does not exceed a confidence level threshold, then at step 530, the confidence predictor 410 decrements the confidence counter 412. As stated, the confidence counter 412 may indicate whether streams in a given thread can benefit from prefetching (e.g., because the thread may be executing a code region that requires sequential memory accesses). At 535, in an embodiment it is determined whether the confidence counter for a thread exceeds first confidence threshold, e.g., aggressive mode confidence threshold 450. If no at 535, it is determined at 540 whether the confidence counter 412 for a thread exceeds second confidence threshold, e.g., ultra-conservative confidence threshold 460. Depending upon the results at 535 and 540 further processing of information and data may be utilized to determine the ramp mode for a particular thread. Further, based on the confidence levels of a given stream, the memory controller 220 may determine which prefetch requests to drop, based on current memory constraints.

Figure 7A:
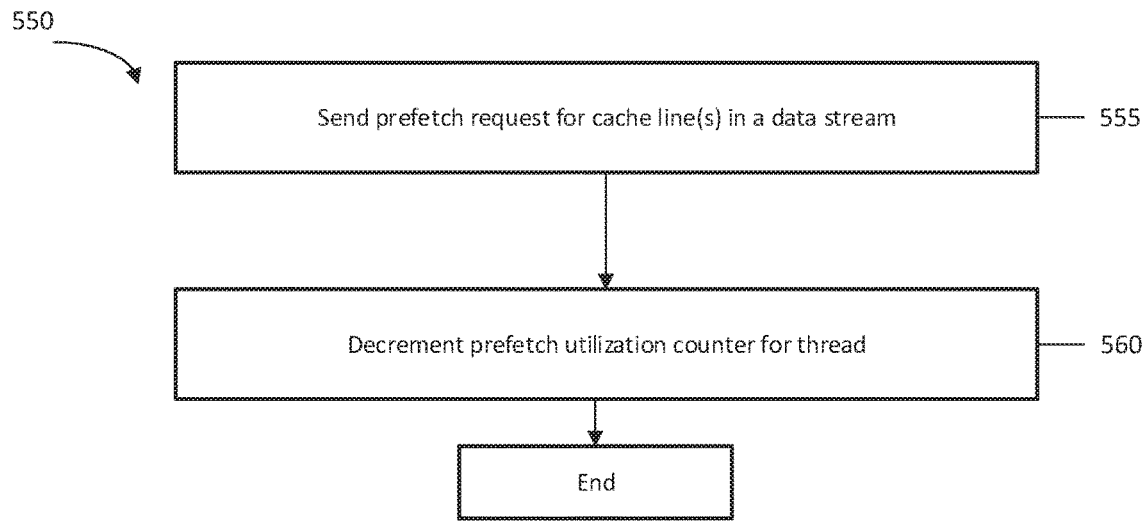
FIG. 7A and FIG. 7B illustrate methods for adjusting a prefetch utilization count, according to one or more embodiments.

FIG. 7A illustrates a method 550 for adjusting a prefetch utilization count, according to one or more embodiments. As shown, the method 550 begins at step 555, where a prefetch request or prefetch function for a cache line in a data stream is sent or generated, preferably by prefetch queue 405. At step 560, thread-specific prefetch utilization counter 432 is decremented.

Figure 7B:
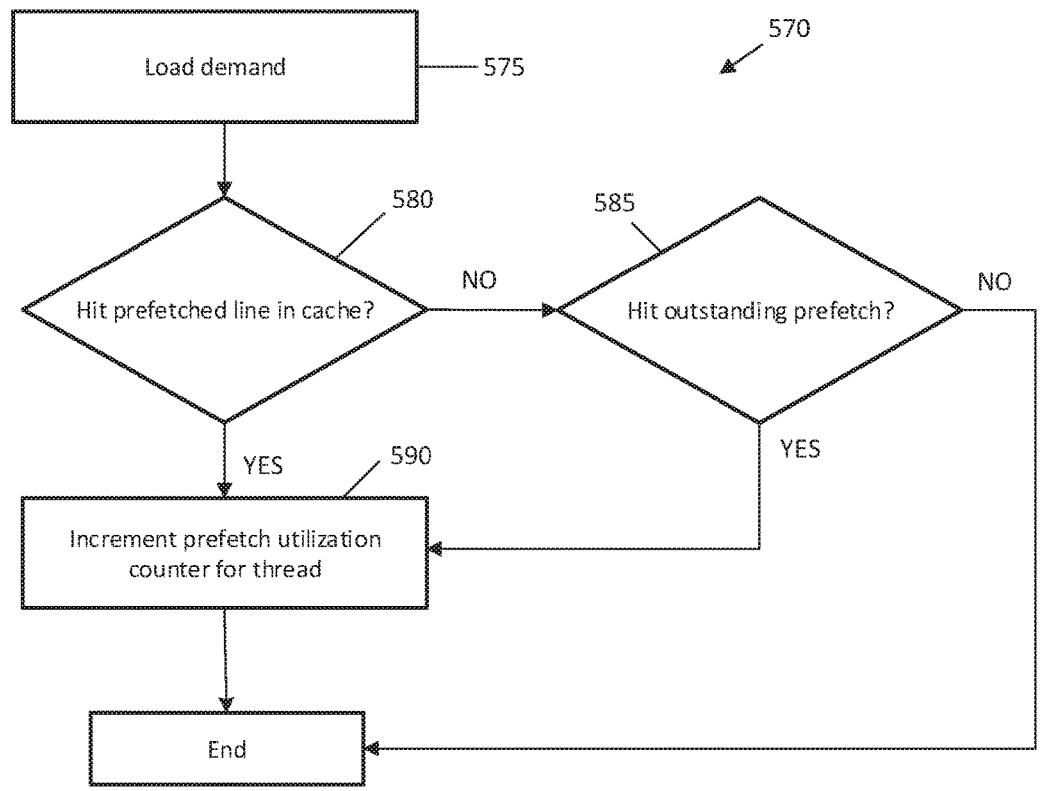

FIG. 7B illustrates a method 570 for adjusting a prefetch utilization count, according to one or more embodiments. As shown method 570 begins at step 575, where a load demand is sent, preferably by core 205. For example, core 205 requests particular data. At step 580, it is determined whether a prefetched cache line is hit, or in other words, whether the request may be satisfied by prefetched data within a cache associated with core 205. If it is determined that the request may be satisfied by prefetched data within the associated cache, the core consumes or utilizes that prefetched cache line, and the prefetch utilization counter 320 is incremented (block 590).

If it is determined that the request cannot be satisfied by prefetched data within the associated cache, at step 585, it is determined whether an outstanding to-be prefetched cache line is hit, or in other words, whether the request may be satisfied by to-be prefetched data (e.g., the requested cache line is inbound, there is an outstanding prefetch request for the requested line, or the like). If it is determined that the request may be satisfied by to-be prefetched data, the prefetch utilization counter 430 is incremented (block 590). If it is determined that the request cannot be satisfied by to-be prefetched data, method 570 ends.

In certain embodiments, method 570 may also include a step of determining whether a confirm would have been seen against a stream where a prefetch is not allowed if prefetching would have been allowed to occur and incrementing the associated prefetch utilization counter 430.

In embodiments, the incrementing and decrementing of the prefetch utilization counters 320 occurs at different instances and are triggered by different, generally unrelated events. The prefetch utilization counters 320 are decremented when a prefetch request is sent. However, subsequently, which may be tens or thousands of cycles from when the prefetched cache line was installed in the cache, the core 205 will consume or utilize the prefetched cache line, whereupon the prefetch utilization counter associated therewith is incremented.

As indicated above, the terms "used prefetched cache line," "cache line is utilized," or the like is defined to mean that a demand load hit a cache line requested by prefetcher 208 within a cache (e.g. last level cache, etc.) of processor 105. In this scenario, prefetched data has already been brought into the cache, speculatively (no load seen yet), and such prefetched cache lines are generally marked with a special state, as is known in the art. This state changes upon the utilization of these cache lines. Because of the associated state change of the cache line that has been utilized, a de facto protection is established to ensure that the prefetch utilization counters 320 do not count two hits/utilizations against the same cache line.

In embodiments, the prefetch utilization counter 320 may be incremented and decremented by different increments. For example, the prefetch utilization counter 320 may be decremented by a value of one for every prefetch sent, and incremented by a value of X for every prefetch utilized. This means that if more than 1/X prefetches are utilized, the prefetch utilization counter 320 saturates at the top, whereas if fewer than 1/X prefetches are utilized, the counter saturates at the bottom. For example, if X is five, but only one prefetch is used for every six sent, there will be a net deficit of one per six prefetches sent and in a short time the prefetch utilization counter 320 will be at zero. Conversely if one prefetch out of four is used on average, we have a net increase of one per four prefetches sent, so the prefetch utilization counter 320 will saturate to a maximum. Thus, in embodiments, the particular prefetch utilization threshold 470 value is adjusted based upon the value of X incrementing the prefetch utilization counter 320 upon prefetch utilization.

In an embodiment, the prefetch utilization counter 432 tracks a ratio that indicates the number of used prefetched cache lines in a thread against one or more of the following (a) the total number of cache lines in the thread that are to be prefetched by prefetcher 208, (b) the number of requested cache lines that need to be fetched from memory 120, and/or (c) the number of cache lines actually returned by memory 120.

Figure 8:
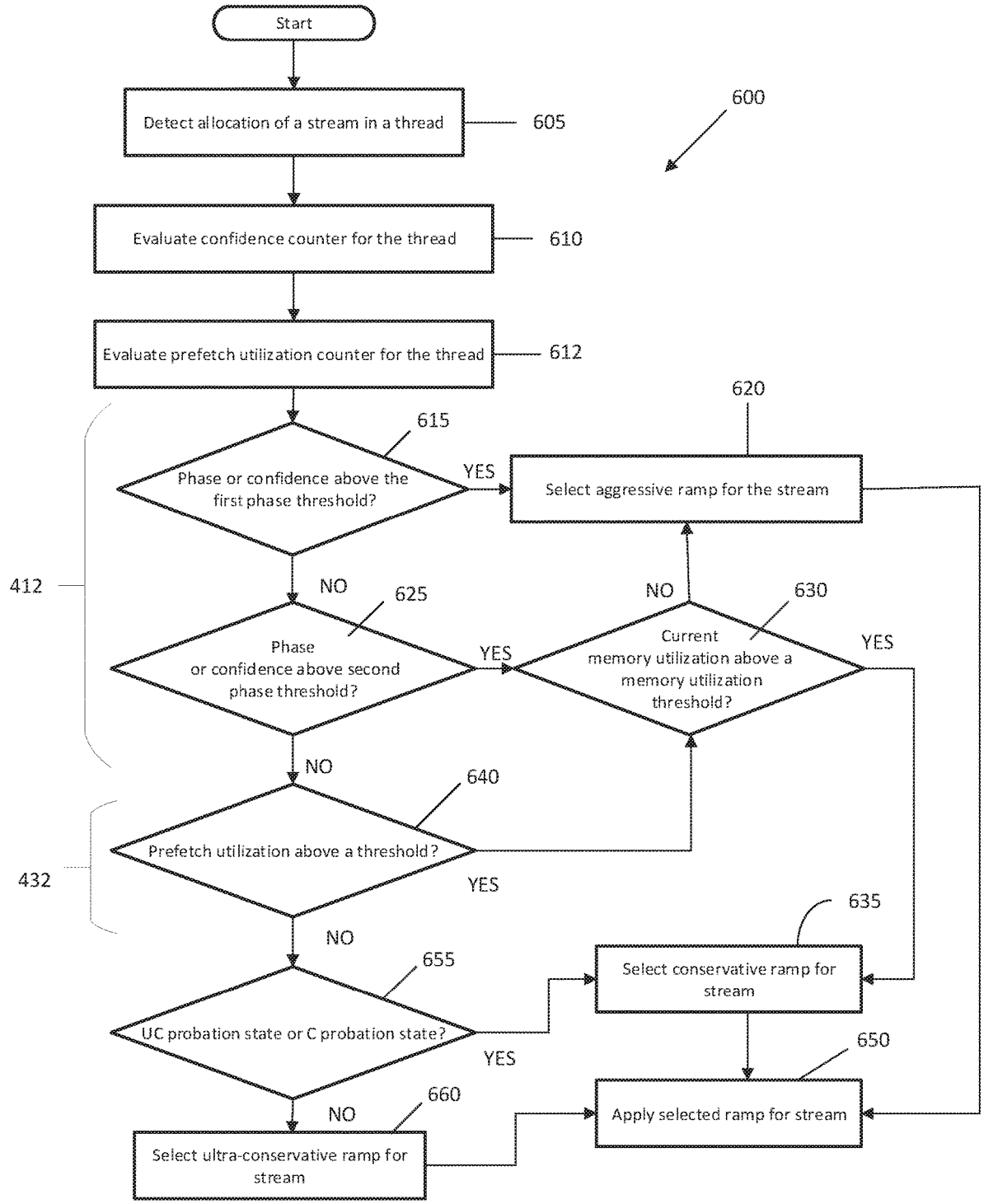
FIG. 8 illustrates a flow diagram of a method for selecting the prefetching ramping mode for a given stream based on confidence levels of prefetch requests, based on prefetch utilization associated with the stream, and/or memory utilization according to one or more embodiments.

FIG. 8 illustrates a method 600 for ramping prefetches of a stream based upon in an embodiment confidence states of prefetch requests, e.g., confidence predictor (e.g., whether confidence thresholds are exceeded), based upon in an embodiment prefetch utilization associated with the stream, and based upon in an aspect memory utilization, according to one or more embodiments. More specifically, method 600 in FIG. 8 illustrates an exemplary method of selecting between prefetch ramping modes as may be performed in a prefetcher in a processor. Method 600 begins at step 605, where the prefetcher 208 detects an allocation of a stream in a given thread. The confidence predictor 410 may send confidence counter 412 information associated with the thread to the ramp selector 415 and the prefetch utilization tracker 430 may send prefetch utilization counter 432 information associated with the thread to the ramp selector 415.

At step 610, the ramp selector 415 in an embodiment evaluates the thread-specific confidence counter 412. At 612, the ramp selector 415 optionally evaluates the thread-specific prefetch utilization counter 432 in an embodiment. The ramp selector 415 may also optionally evaluate current memory resource utilization (retrieved from the memory controller 220). At step 615, the ramp selector 415 determines whether the confidence counter 412 is above the first (aggressive) confidence threshold 450. That is, the ramp selector 415 determines whether the thread is associated with a relatively high amount of confident or non-confident state requests. At step 620, if the confidence counter 412 is above the first (aggressive) confidence threshold 450 (step 615: Yes), which indicates that the thread is associated with a relatively high amount of confident state prefetch requests, the ramp selector 415 selects the aggressive ramp for the stream.

At step 625, if the confidence counter 412 is below the first confidence threshold (615: No), e.g., aggressive confidence threshold 450, it is determined whether the confidence counter 412 is above a second confidence threshold, e.g., ultra-conservative confidence threshold 460. That is, the ramp selector 415 determines whether the thread is associated with a relatively high amount of confident or non-confident state requests. If the confidence counter 412 is below the second confidence threshold, e.g., ultra-conservative confidence threshold 460 (i.e., step 625: No), then the ramp selector 415 is allowed to select (but does not necessarily select) the ultra-conservative ramp or UC probationary state for the stream and method 600 may continue to step 640. If the confidence counter 412 is above the second confidence threshold, e.g., ultra-conservative confidence threshold 460. (i.e., step 625: Yes), then the ramp selector 415 is prevented from selecting the ultra-conservative ramp for the stream and method 600 continues to step 630.

At step 630, the ramp selector 415 evaluates current memory 120 utilization to determine whether the current memory 120 utilization exceeds a memory utilization threshold. That is, the ramp selector 415 evaluates whether the memory 120 is currently busy or constrained. At step 630, if the memory 120 is not currently busy or constrained (step 630: No), the ramp selector 415 selects the aggressive ramp for the stream. Doing so allows the prefetcher 208 to increase efficiency by using memory resources that might otherwise go unused, even if the prefetches are from threads associated with low-confidence counter 412.

Otherwise, at step 630, if the current memory 120 utilization exceeds the memory utilization threshold (e.g., memory 120 is busy, constrained, or the like), i.e., step 630: Yes, then the ramp selector 415 selects the conservative ramp for the stream at step 635. After step 635, method 600 continues to step 650 where the selected ramp type is applied.

If the confidence counter 412 is below the second confidence threshold, e.g., ultra-conservative confidence threshold 460, e.g., step 625: No, which indicates that the thread is associated with a relatively low or no amount of confident state prefetch requests, the ramp selector 415 at step 640 evaluates the thread-specific prefetch utilization counter 432 to determine whether the prefetch utilization counter 432 is above the prefetch utilization threshold 470. That is, the ramp selector 415 determines whether the thread is associated with a relatively high amount of utilized or non-utilized prefetched cache lines.

At step 640, if the prefetch utilization counter 432 is above the prefetch utilization threshold 470 (step 640: Yes), which indicates that the thread is associated with a relatively high amount of utilized prefetched cache lines, method 600 returns to step 630.

If at 640 the prefetch utilization counter 432 is below the prefetch utilization threshold 470 (step 640: No), which indicates that the stream is associated with a relatively low amount of utilized prefetched cache lines, method 600 continues to step 655, where the ramp selector 415 determines whether the prefetcher is in a probation state, and in the example of FIG. 8 whether the prefetch is in the UC probation state or the C probation state. If at 655 it is determined that the prefetcher is in a probation state (655: Yes), the prefetcher continues to 635 where the prefetcher selects the conservative ramp for the stream. If at 655 it is determined that the prefetcher is not in a probation state (655: No), then the prefetcher continues to step 660 where the prefetcher selects the ultra-conservative ramp mode. After 655, the method continues to step 650.

At step 650, the prefetch request queue 405 applies the selected ramp for the stream. For example, the prefetch request queue 405 applies the aggressive ramp selected at step 620 to the stream, or applies the conservative ramp selected at step 635 to the stream.

Figure 9A:
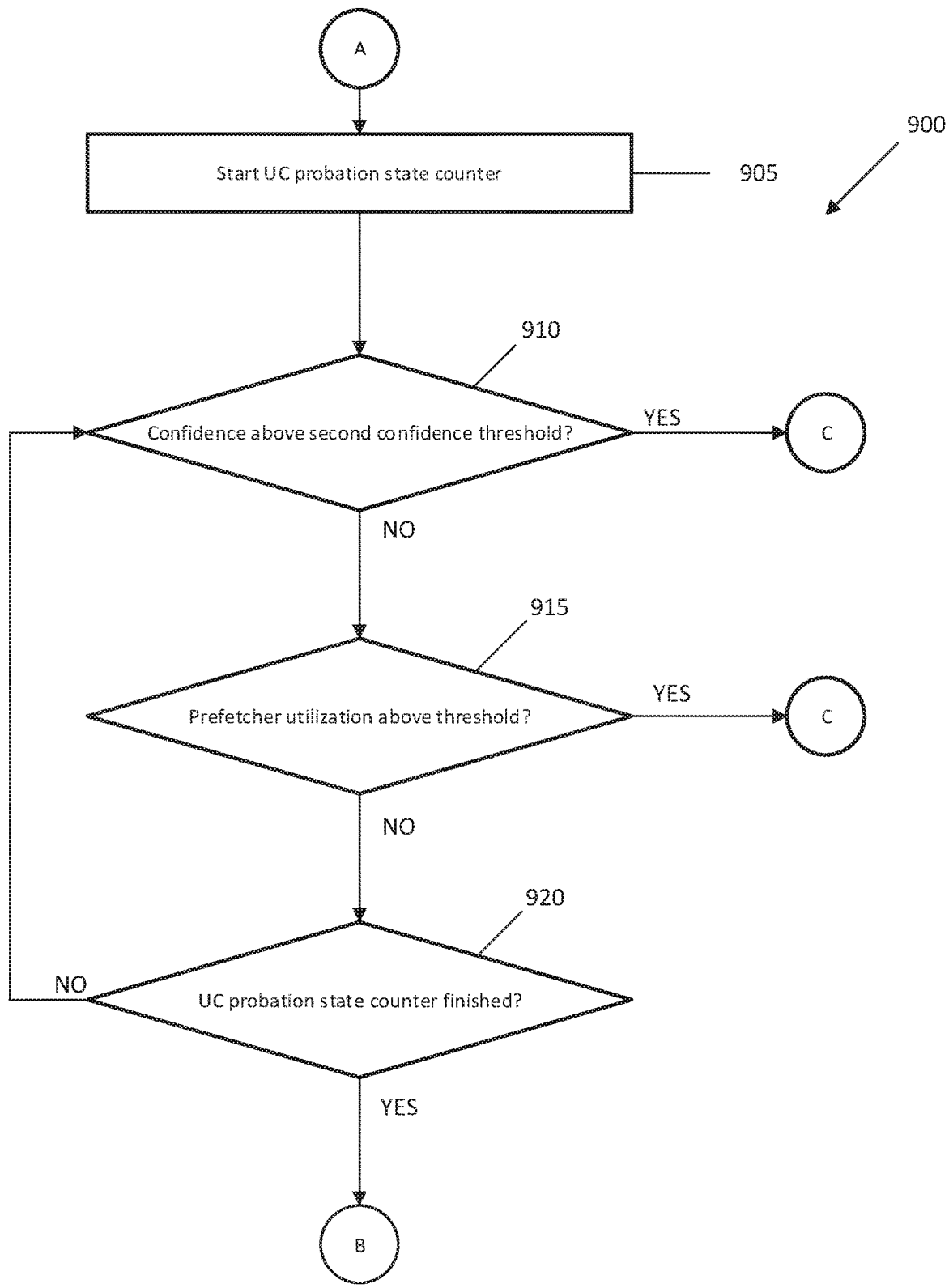
FIGS. 9A, 9B and 9C illustrates a flow diagram of how a mode governor transitions threads between probation states and two prefetching modes.
Figure 9B:
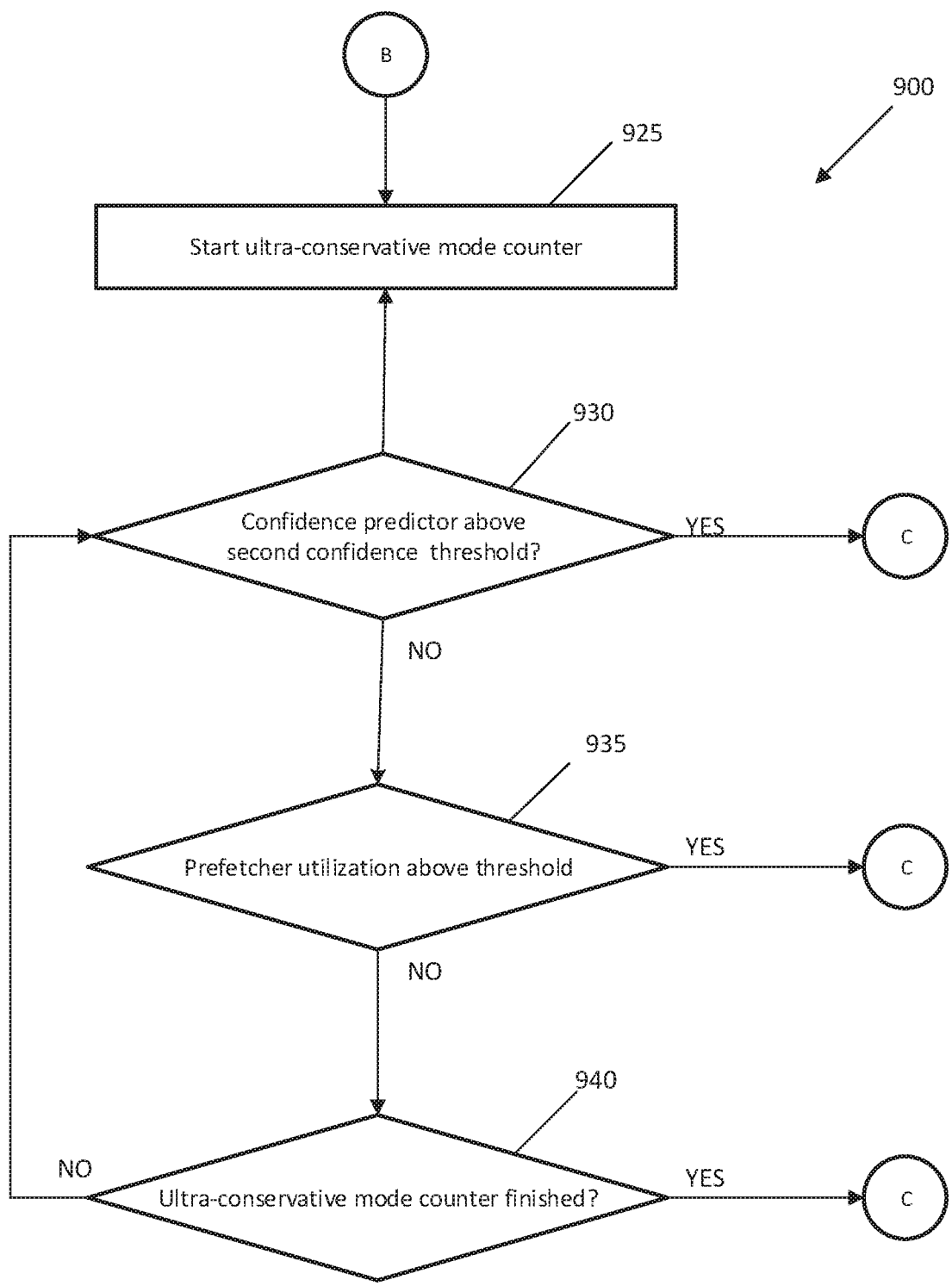
Figure 9C:
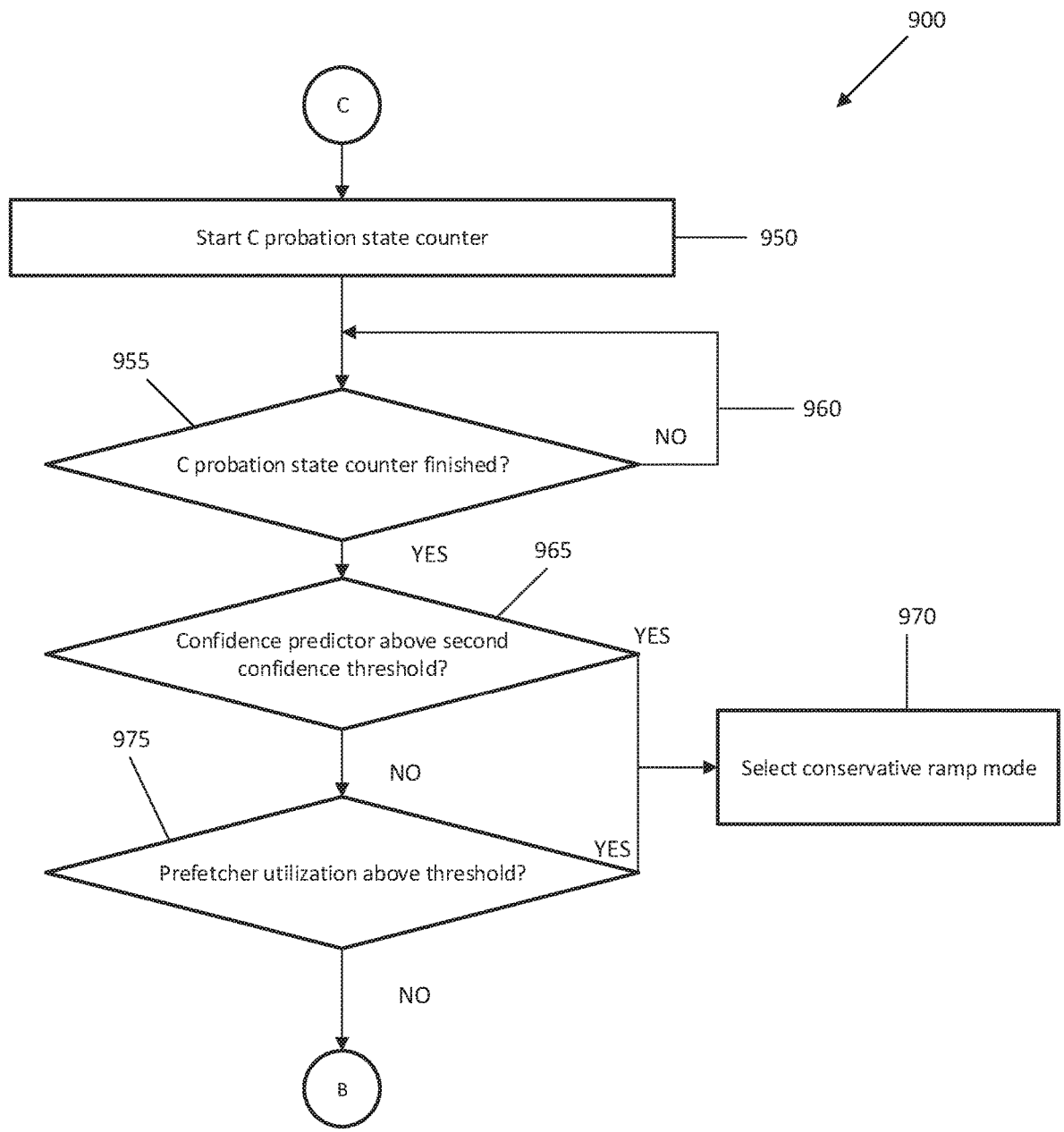

FIGS. 9A, 9B, and 9C illustrate a method 900 of a thread transitioning between probation states and a prefetching mode, e.g., ultra-conservative prefetching ramp mode. In an embodiment, method 900 in FIGS. 9A-9C elaborates on FIG. 5 and describes the mode governor 417 of the ramp selector 415. At 905 the UC probation state counter, e.g., the mode governor counter 418, starts counting. While in the UC probation state, the memory is assumed busy and the prefetcher continues to allocate according to the conservative ramp mode principles, rules, and logic. At 910, while in the UC probation state, the prefetcher, and in an embodiment the ramp selector, evaluates and/or determines whether the confidence counter is above the second confidence threshold, e.g., above the ultra-conservative confidence threshold 460. That is, the ramp selection 415 determines whether the thread is associated with a relatively high amount of confident requests. If the confidence counter 412 is above the second confidence threshold, e.g., ultra-conservative threshold 460 (910: Yes), then the process 900 continues to sub-process C in FIG. 9C.

If the confidence counter 412 is below the second confidence threshold (910: No), e.g., below ultra-conservative threshold 460, then the method 900 proceeds to 915. At 915, the ramp selector 415 evaluates the thread specific prefetch utilization counter 432 to determine whether the prefetch utilization counter 432 is above the prefetch utilization threshold, e.g., above prefetch utilization threshold 470. That is, the ramp selector 415 determines whether the thread is associated with a relatively high amount of utilized prefetch cache lines. If the prefetch utilization counter 432 is above the prefetch utilization threshold, e.g., above prefetch utilization threshold 470 (915: Yes), then the process continues to sub-process C in FIG. 9C.

If the prefetch utilization counter 432 is below the prefetch utilization threshold (915: No), e.g., below prefetch utilization 470, then method 900 proceeds to 920. At 920, it is determined whether mode governor counter 418 finished counting. For example, mode governor counter 418 can count N cycles upon entering UC probation state, and at 920, the prefetcher determines whether mode governor counter 418 has counted N cycles. If at 920, the mode governor counter has counted N cycles or more (920: Yes), then method 900 continues by selecting and applying the ultra-conservative ramp mode, and thereafter continues to sub-process B in FIG. 9B.

FIG. 9B continues method 900 where at 925 the ultra-conservative mode starts a counter. That is, upon entering ultra-conservative mode the mode governor counter 518 starts counting M cycles. While in ultra-conservative mode, the prefetcher operates according to ultra-conservative ramp mode principles, rules and logic. At 930, while in the ultra-conservative mode, the prefetcher, and in an embodiment the ramp selector, evaluates and/or determines whether the confidence counter is above the second confidence threshold, e.g., above ultra-conservative confidence threshold 460. That is, ramp selector 415 determines whether the thread is associated with a relatively high amount of confident requests. If the confidence counter 412 is above the second confidence threshold, e.g., ultra-conservative threshold 460 (930: Yes), then process 900 continues to sub-process C in FIG. 9C.

If at 930 the confidence counter 412 is below the second confidence threshold (930: No), e.g., ultra-conservative confidence threshold 460, then the method 900 proceeds to 935. At 935, the ramp selector 415 evaluates the thread specific prefetch utilization counter 432 to determine whether the prefetch utilization counter 432 is above a prefetch utilization threshold, e.g., prefetch utilization threshold 470 (or a different higher prefetch utilization threshold). That is, the ramp selector 415 determines whether the thread is associated with a relatively high amount of utilized prefetch cache lines. If the prefetch utilization counter 432 is above the prefetch utilization threshold, e.g., above prefetch utilization threshold 470 (935: Yes), then the process continues to sub-process C in FIG. 9C.

If the prefetch utilization counter 432 is below the prefetch utilization threshold (935: No), e.g., below prefetch utilization threshold 470, then the method 900 proceeds to 940. At 940, it is determined whether the mode governor counter has finished counting M cycles. For example, mode governor counter 418 can count M cycles upon entering ultra-conservative ramp mode, and at 940, the prefetcher determines whether mode governor counter 418 has counted M cycles. If at 940, the mode governor counter 418 has counted M cycles or more (940: Yes), then method 900 continues to sub-process C in FIG. 9C.

If at 940, the mode governor counter 418 has not counted M cycles (counter may count up or down to M cycles) (940: No), then process 900 continues at 930 (and/or 935). That is, after a certain amount of cycles the prefetcher moves to the C probation state where the prefetcher allocates in conservative mode, so that streams that are stuck in the ultra-conservative prefetching mode can get out of ultra-conservative mode and so the prefetcher can smoothly ramp up.

FIG. 9C continues method 900 at C where at 950, a C probation state counter starts counting upon entering C probation state. That is, mode governor counter 418 starts counting in response to and upon the prefetcher entering C probation state. At 955, it is determined whether C probation state has counted a predetermined, selected, programmed, or designated number of cycles, e.g., P cycles. If mode governor counter 418 has not counted the predetermined, adjustably selected, programmed, or designated cycles, e.g., P cycles, whether by counting up or down (955: No), then the prefetcher continues to operate in C probation state until P cycles have completed.

In response to mode governor counter counting P cycles, the predetermined, adjustably selected, programmed, or designated number of cycles (955: Yes), the method continues to 965. That is, in C probation state, the prefetcher counts P cycles for example, and then continues to 965. At 965, the prefetcher, and in an embodiment the ramp selector, evaluates and/or determines whether the confidence counter is above the second confidence threshold, e.g., above the ultra-conservative threshold 460. That is, the ramp selector 415 determines whether the thread is associated with a relatively high amount of confident requests. If the confidence counter 412 is above the second confidence threshold, e.g., above ultra-conservative confidence threshold 460

(965: Yes), then the process continues to 970 where it selects the conservative ramp mode. The new prefetching mode will be applied to any new streams that are allocated after step 970.

If at 965, it is determined that the confidence counter 412 is below the second confidence threshold (965: No), then method 900 continues to 975. At 975, it is determined whether the prefetcher utilization counter 432 is above a prefetch utilization threshold, e.g., above prefetch utilization threshold 470. In an embodiment, the ramp selector 415 evaluates the thread specific prefetch utilization counter 432. That is, the ramp selector 415 determines whether the thread is associated with a relatively high amount of utilized prefetch cache lines. If the prefetch utilization counter is above the prefetch utilization threshold, e.g., above prefetch utilization threshold 470 (975: Yes), then the process continues to 970 where the prefetcher selects the conservative mode. The new prefetching mode will be applied to any new streams that are allocated after step 970.

If at 975 the prefetch utilization counter 432 is below the prefetch utilization threshold, e.g., below prefetcher utilization threshold 470 (975: No), then the process continues to sub-process B in FIG. 9B.

In an aspect, a method is disclosed that includes issuing a plurality of requests to pre-fetch data; evaluating a confidence level of each request to pre-fetch data based upon an amount of confirmations observed in the plurality of requests to pre-fetch data to which the request belongs; assigning one of a first more aggressive prefetching ramp mode, or a second less aggressive prefetching ramp mode based upon the confidence level of a thread associated with request to pre-fetch data; applying a first probation state in response to transitioning from the first more aggressive prefetching ramp mode for a number of cycles or until the confidence level is above a confidence threshold level; and optionally applying a second probation state in response to transitioning from a second less aggressive prefetching ramp mode for a number of cycles or until the confidence level is below the confidence threshold level.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For example, the example refers to and uses three prefetching modes and two probation states, when it can be appreciated that the disclosure and teaching would easily apply to more or less prefetching ramp modes and more or less probation states, including but not limited to two prefetching ramp modes and one or two probation states governing the prefetching principles, rules, and logic. Moreover, while the prefetching modes used criteria such as confidence level, prefetch utilization, and/or memory utilization to determine the prefetching mode and the governing rules to apply, it will be appreciated that different criteria could be used to determine the prefetching mode, and different principles, rules, and logic could be applied to define the manner of issuing prefetch requests and the amount of ramping applied to a stream.

The terminology used herein was chosen to best explain the principles of the embodiments, the practical application or technical improvement over technologies found in the marketplace, or to enable others of ordinary skill in the art to understand the embodiments disclosed herein. Thus, terms such as aggressive prefetching mode, conservative prefetching mode, and ultra-conservative prefetching mode are only terms used to differentiate modes and should not be used to limit the disclosure.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments presented herein may be devised without departing from the basic scope thereof, and the scope thereof is determined by the claims that follow.

What is claimed is:

1. A processor, comprising:
   a prefetcher configured to:
   issue a plurality of requests to pre-fetch data from a prefetch stream in a plurality of prefetch streams;
   evaluate a confidence level of each request to pre-fetch data based on an amount of confirmations observed in the prefetch stream; and
   assign at least a first more aggressive prefetching ramping mode or a second less aggressive prefetching ramping mode to the request to pre-fetch data based upon the confidence level of a thread associated with the request to pre-fetch data,
   wherein the prefetcher is further configured to have a first probation state and a second probation state, the first probation state for transitioning from the first more aggressive prefetching ramping mode to the second less aggressive prefetching ramping mode and the second probation state for transitioning from the second less aggressive prefetching ramping mode, and
   wherein, in response to operating in the first probation state, the prefetcher prefetches according to the first more aggressive prefetching ramping mode, and in response to operating in the second probation state the prefetcher prefetches according to the first more aggressive prefetching ramping mode.

2. The processor according to claim 1, wherein the prefetcher is further configured to remain in the first probation state for a number of cycles.

3. The processor according to claim 1, wherein the processor is further configured to determine a prefetch utilization count for each thread based upon the number of cache lines in the thread that are being utilized and the first and second prefetching ramping mode is based at least in part upon the prefetch utilization count.

4. The processor according to claim 3, wherein the prefetcher has a confidence counter to evaluate a confidence level for the thread, and a prefetch utilization counter to determine a prefetch utilization count for the thread.

5. The processor according to claim 1, wherein the prefetcher further includes a third prefetching ramping mode that is more aggressive than the first prefetching ramping mode, and in response to operating in the second probation state the prefetcher cannot issue requests to prefetch data other than according to the first prefetching ramping mode.

6. The processor according to claim 1, wherein the prefetcher is further configured to remain in the second probation state for a number of cycles.

7. The processor according to claim 1, wherein the prefetcher is configured to exit from the first probation state and enter the second probation state at least in part in response to the confidence level of the thread of prefetch requests increasing above a threshold confidence level or a prefetch utilization count based upon the number of cache lines in the thread that are being utilized increasing above a threshold prefetch utilization count.

8. The processor according to claim 1, wherein the prefetcher is configured to exit from the second less aggressive prefetching ramping mode and enter the second probation state after a number of cycles, wherein the number of cycles can be predetermined, adjustably selected, or programmed.

9. The processor according to claim 1, wherein the processor is further configured to determine a prefetch utilization count based upon the number of cache lines in a thread that are being utilized and the first and second prefetching ramping mode is based at least in part upon the prefetch utilization count.

10. A system, comprising:
a memory; and
a processor, comprising:
a prefetcher comprising:
a prefetch request queue configured for tracking a plurality of requests to prefetch data issued for each stream in a plurality of streams;
a confidence predictor configured to evaluate the confidence levels of prefetch requests in a stream;
a ramp selector configured to determine the prefetcher ramping mode based at least in part upon the confidence level of a thread associated with the prefetch requests in the stream, wherein the ramp selector selects between at least a first more aggressive prefetcher ramping mode and a second less aggressive prefetcher ramping mode, and
a prefetch mode governor that governs at least a first probation state for controlling transitioning between the first prefetcher ramping mode and the second prefetcher ramping mode and a second probation state for controlling transitioning from the second prefetcher ramping mode,
wherein the prefetcher is configured to exit from the second less aggressive prefetcher ramping mode and enter the first probation state after a certain amount of cycles in the second less aggressive prefetcher ramping mode, and
wherein the prefetcher is configured to exit from the first more aggressive prefetcher ramp mode and enter the second probation state for transitioning from the first more aggressive prefetcher ramp mode to the second less aggressive prefetcher ramp mode, wherein, in response to operating in the first probation state, the prefetcher prefetches according to the first more aggressive prefetching ramp mode, and in response to operating in the second probation state the prefetcher prefetches according to the first more aggressive prefetching ramp mode.

11. The system according to claim 10, wherein the confidence predictor has a confidence counter to evaluate the confidence level for each thread, and the mode governor has a mode governor counter for counting the number of cycles the prefetcher operates in the second prefetcher ramping mode and in the at least first probation state, wherein in response to exiting the second less aggressive prefetcher ramping mode and entering the first probation state the prefetcher is configured to operate according to the first more aggressive prefetcher ramping mode.

12. The processor according to claim 10, wherein the prefetcher is configured to transition from the second probation state to the first probation state at least in part in response to the confidence level of the thread of prefetch requests increasing above a threshold confidence level or a prefetch utilization count based upon the number of cache lines in the thread that are being utilized increasing above a threshold prefetch utilization count.

13. The processor according to claim 10, wherein the prefetcher is configured to transition from the second probation state to the second less aggressive prefetcher ramping mode after a number of cycles.

14. The processor according to claim 10, wherein the prefetcher is configured to transition from the first probation state to the first more aggressive prefetcher ramping mode after a number of cycles in the first probation state, and in response to the confidence level being above a threshold confidence level.

15. The processor according to claim 10, wherein the prefetcher further comprises a prefetch utilization tracker that includes a prefetch utilization counter configured to determine a prefetch utilization count based upon the number of cache lines in the thread that are being utilized and the first and second prefetcher ramping mode is based at least in part upon the prefetch utilization count.

16. A processor, comprising: a prefetcher configured to:
issue a plurality of requests to pre-fetch data from a prefetch stream in a plurality of prefetch streams;
evaluate a confidence level of at least the first request to pre-fetch data based on an amount of confirmations observed in the pre-fetch stream;
determine a prefetch utilization count based upon the number of cache lines in the pre-fetch stream that are being utilized; and
assign at least a first more aggressive prefetching ramp mode or a second less aggressive prefetching ramp mode based at least in part upon the confidence level and prefetch utilization count of a thread associated with the request to pre-fetch data,
wherein the prefetcher is further configured to exit from the first prefetching ramp mode and enter a first probation state wherein the prefetcher continues to operate according to the first more aggressive prefetching ramp mode, and configured to exit from the second less aggressive prefetching ramp mode and enter a second probation state wherein the prefetcher operates according to the first more aggressive prefetching ramp mode.

17. The processor according to claim 16, wherein the prefetcher is further configured to exit from the second less aggressive prefetching ramp mode and enter the second probation state after a number of cycles, or in response to the confidence level being above a threshold confidence level, or in response to the prefetch utilization rate being above a prefetch utilization threshold.

18. The processor according to claim 17, wherein the prefetcher is further configured to exit from the second probation state after a number of cycles, and in response to the confidence level being above the threshold confidence level or the prefetch utilization rate being above the prefetch utilization threshold.

\* \* \* \* \*